United States Patent
Natarajan et al.

(10) Patent No.: US 11,539,606 B2
(45) Date of Patent: Dec. 27, 2022

(54) METHOD AND APPARATUS FOR MEASURING PACKET LOSS RATE VIA DEEP PACKET INSPECTION AT AN INTERMEDIATE NODE IN A COMMUNICATION NETWORK

(71) Applicant: Celona, Inc., Cupertino, CA (US)

(72) Inventors: Preethi Natarajan, Saratoga, CA (US); Mehmet Yavuz, Palo Alto, CA (US); Phaneendra Mettu, Pleasanton, CA (US)

(73) Assignee: Celona, Inc., Campbell, CA (US)

( * ) Notice: Subject to any disclaimer, the term of this patent is extended or adjusted under 35 U.S.C. 154(b) by 89 days.

(21) Appl. No.: 17/160,019

(22) Filed: Jan. 27, 2021

(65) Prior Publication Data

US 2021/0250266 A1    Aug. 12, 2021

Related U.S. Application Data

(63) Continuation-in-part of application No. 17/078,990, filed on Oct. 23, 2020.
(Continued)

(51) Int. Cl.
*H04L 1/00* (2006.01)
*H04L 12/26* (2006.01)
(Continued)

(52) U.S. Cl.
CPC ........ *H04L 43/0829* (2013.01); *H04L 43/028* (2013.01); *H04L 43/106* (2013.01); *H04L 43/12* (2013.01)

(58) Field of Classification Search
None
See application file for complete search history.

(56) References Cited

U.S. PATENT DOCUMENTS 7,821,937 B1 * 10/2010 Guo ................ H04L 43/0829
                                                   370/230.1
9,787,559 B1    10/2017 Schroeder
(Continued)

FOREIGN PATENT DOCUMENTS

EP          3005622         9/2018
WO       2015016919         2/2015
(Continued)

OTHER PUBLICATIONS

Thomas, Shane, International Search Report and Written Opinion received from the URSO dated Sep. 28, 2021 for appln. No. PCT/US2021/17332, 9 pgs.
(Continued)

*Primary Examiner* — Scott M Sciacca
(74) *Attorney, Agent, or Firm* — Jaquez Land Greenhaus & McFarland LLP; Bruce W. Greenhaus, Esq.

(57) ABSTRACT

A method and apparatus for monitoring network performance in near real-time by making measurements on packets received at an intermediate node in wireless communication network. The solution is useful for monitoring wireless network performance of any packetized wireless communication network that connects a client and application server, and particularly for any application running over TCP/IP protocol. A method is disclosed for measuring packet loss rate of a packet-based communication session between a Network Source (NS) and a User Equipment (UE) device at an intermediate node, in the downlink direction and the uplink direction. The measured loss is indicative of the loss in the portion of wireless network between the intermediate node and the UE. The measured packet loss rate is compared with service guarantees for the wireless network, and if the service guarantees are not being met, then resolution mechanisms can be implemented.

11 Claims, 28 Drawing Sheets

Related U.S. Application Data

(60) Provisional application No. 62/972,167, filed on Feb. 10, 2020.

(51) Int. Cl.
*H04L 43/0829* (2022.01)
*H04L 43/106* (2022.01)
*H04L 43/12* (2022.01)
*H04L 43/028* (2022.01)

(56) References Cited

U.S. PATENT DOCUMENTS

| | | | |
|---|---|---|---|
| 2007/0195797 A1* | 8/2007 | Patel | H04L 43/0852 370/469 |
| 2012/0136697 A1* | 5/2012 | Peles | G06Q 10/0639 705/7.38 |
| 2014/0307562 A1 | 10/2014 | Bruckman | |
| 2015/0333999 A1 | 11/2015 | Mordani et al. | |
| 2017/0366467 A1 | 12/2017 | Martin et al. | |
| 2018/0103143 A1* | 4/2018 | Wei | H04M 3/2236 |
| 2021/0250268 A1 | 8/2021 | Natarajan et al. | |
| 2022/0150130 A1* | 5/2022 | Ku | H04L 41/147 |

FOREIGN PATENT DOCUMENTS

| | | |
|---|---|---|
| WO | 2018068810 | 4/2018 |
| WO | 2021163101 | 8/2021 |

OTHER PUBLICATIONS

Young, Lee, International Search Report and Written Opinion received from the USRO dated Apr. 28, 2021 for appln. No. PCT/US2021/017338, 19 pgs.

* cited by examiner

METHOD AND APPARATUS FOR MEASURING PACKET LOSS RATE VIA DEEP PACKET INSPECTION AT AN INTERMEDIATE NODE IN A COMMUNICATION NETWORK

CROSS-REFERENCE TO RELATED APPLICATION

This application is a continuation-in-part of and claims priority to commonly owned and co-pending U.S. patent application Ser. No. 17/078,990, filed Oct. 23, 2020, entitled "Method and Apparatus for Measuring End-to-End Packet Latency and Packet Delay Variation via Deep Packet Inspection at an Intermediate Node of a Communication Network", which claims priority to commonly owned U.S. Patent Provisional Application No. 62/972,167, filed Feb. 10, 2020, entitled "Method and Apparatus for Measuring End-to End Packet Latency, Packet Delay Variation and Packet Loss Rate via Deep Packet Inspection at an Intermediate Node in a Communication Network", the disclosures of which are incorporated herein by reference in its entirety.

BACKGROUND

Technical Field

The disclosed method and apparatus relate to communication networks and more particularly to methods and apparatus for real time monitoring of communication parameters in packet-based communications networks to maintain quality of service and more efficiently use network resources.

Background

The wireless industry has experienced tremendous growth in recent years. Wireless technology is rapidly improving, and faster and more numerous broadband communication networks have been installed around the globe. These networks have now become key components of a worldwide communication system that connects people and businesses at speeds and on a scale unimaginable just a couple of decades ago. The rapid growth of wireless communication is a result of increasing demand for more bandwidth and services. This rapid growth is in many ways supported by standards. For example, 4G LTE has been widely deployed over the past years, and the next generation system, and 5G NR (New Radio) is now being deployed. In these wireless systems, multiple mobile devices are served voice services, data services, and many other services over wireless connections so they may remain mobile while still connected.

Wireless networks have a wide range of applications and uses. Enterprises particularly have a great interest in implementing wireless networks at their enterprise location, and digital solutions more generally, to improve efficiency and reduce costs. Enterprises benefit from optimizing their computing, storage and networking infrastructure, and improving performance of the business applications within their business location, which increases business efficiencies and reduces cost.

FIG. 1 is an illustration of a basic configuration for a communication network, such as a "4G LTE" (fourth generation Long-Term Evolution) or "5G NR" (fifth generation New Radio) network. Through this network configuration, user equipment (UE) 101a and 101b can connect to External Packet Data Networks (PDNs) 103 and access any of a variety of services such as the Internet, Application Servers, Data Services, Voice Services, and others.

The UEs 101a and 101b connect wirelessly over respective communication links 105a and 105b to a Radio Access Network (RAN) 107 that includes a base station/access point (BS/AP) 109. One of the advantages of such networks is their ability to provide communications to and from multiple wireless devices and provide these wireless devices with access to a large number of other devices and services even though the devices may be mobile and moving from location to location.

UE

As used herein, the term "UE" refers to a wide range of user devices having wireless connectivity, such as a cellular mobile phone, an Internet of Things (IOT) device, virtual reality goggles, robotic devices, autonomous driving machines, smart barcode scanners, and communications equipment including for example cell phones, desktop computers, laptop computers, tablets and other types of personal communications devices. In some cases, the UEs may be mobile; in other cases, they may be installed at a fixed location. For example, a factory sensor may be installed at a fixed location from which it can remotely monitor an assembly line or a robotic arm's movement.

BS/AP

The term "BS/AP" is used broadly herein to include base stations and access points, including at least an evolved NodeB (eNB) of an LTE network or gNodeB of a 5G network, a cellular base station (BS), a Citizens Broadband Radio Service Device (CBSD) (which may be an LTE or 5G device), a Wi-Fi access node, a Local Area Network (LAN) access point, a Wide Area Network (WAN) access point, and should also be understood to include other network receiving hubs that provide access to a network of a plurality of wireless transceivers within range of the BS/AP. Typically, the BS/APs are used as transceiver hubs, whereas the UEs are used for point-to-point communication and are not used as hubs. Therefore, the BS/APs transmit at a relatively higher power than the UEs.

Core Network

The RAN 107 connects the UEs 101 with the Core Network 111, which has many functions. One function of the Core Network 111 is to provide control of wireless signaling between the UEs 101 and the RAN 107, and another function is to provide access to other devices and services either within its network, or on other networks such as the External PDNs 103. Particularly, in cellular networks and in private networks, the BS/AP 109 can receive wireless signals from, and send wireless signals to, the UEs 101. The RAN 107 is coupled to the core network 111; therefore, the RAN 107 and the Core Network 111 provide a system that allows information to flow between a UE in the cellular or private network and other networks, such as the Public Switched Telephone Network (PSTN) or the Internet. Wireless data transmission between a UE 101 and the BS/AP 109 occurs on an assigned channel, such as a specific frequency. Data transmission between the BS/AP 109 and the Core Network 111 utilizes any appropriate communication means, such as wireless, cable, and fiber optic.

4G and 5G Architectures

4G/LTE and/or 5G wireless communication networks; that is, communication networks that are constructed according to the specifications of Standard Development Organizations (SDOs) such as 3GPP, are well-documented. The basic components of these communication networks are well-known, and need not be discussed in detail, but are discussed briefly below. Much additional information is available in the current SDO specifications, such as 3GPP specifications TS 21.905, TS 22.852, TS 23.002, TS 23.203, TS 23.501, TS 36.300.

FIG. 2 is a block diagram showing one architecture of an LTE (4G) wireless communication system 200. The 4G network has a flat, all-IP architecture with a separation of control plane and user plane traffic. Acronyms are shown in the network blocks.

FIG. 3 is a block diagram of a 4G architecture 300 in which bearers are illustrated by their letter symbols and lines connecting components. FIG. 4 is a block diagram of a 4G architecture 400 in which the bearers are illustrated by name type and by paths between components blocks. In LTE and 5G communication systems, a bearer is an information transmission path that has defined capacity, delay and bit error rate, and possibly other characteristics. Depending upon the configuration of the communication system as implemented, a number of bearers will be defined across different blocks of the system. As will be apparent to one skilled in the art, the bearers available in any particular network architecture may differ.

FIG. 5 is a block diagram of a 5G wireless communication network 300. In this 5G architecture, a Core Network is referenced as 5GC (5G Core). In FIG. 3, acronyms are shown in the network blocks.

CBRS Networks

One type of wireless network that recently became available for general use by enterprise locations is a Citizen's Broadband Radio Service (CBRS) network, which utilizes the CBRS radio band of 3550-3700 MHz, nominally divided into fifteen channels of 10 MHz each. Particularly, the US Federal Government recently approved use of the CBRS band of the frequency spectrum and finalized rules (Rule 96) that allow general access to the CBRS band. The CBRS rules set forth detailed requirements for the devices that operate in a CBRS network and how they communicate. CBRS supports both LTE and 5G devices. Base stations (BS/APs) within a CBRS network are termed "CBSDs", and UEs are termed End User Devices (EUDs). CBSDs are fixed Stations, or networks of such stations, that operate on a Priority Access or General Authorized Access basis in the Citizens Broadband Radio Service consistent with Title 47 CFR Part 96 of the United States Code of Federal Regulations (CFR).

Network Performance and Service

Communication networks such as 4G LTE or 5G NR networks deliver connectivity services for different mobile devices and different applications running over the network such as voice, video, real time control and web browsing. Usually these applications have a desired quality of service. For example, in enterprise networks with private 4G LTE or 5G NR systems, different applications require different levels of service in accordance with the needs of the application, and/or service level agreements (SLAs). Typically, these SLAs are translated to maximum bounds on specific Key Performance Indices (KPIs) such as packet error rate, packet delay and packet variation.

Creating end-to-end data paths (e.g., network slices) in 4G LTE and 5G NR networks is one way to provide appropriate Key Performance Indices (KPIs) for different applications. These end-to-end data paths may be designed to provide end-to-end QoS guarantees related to latency, packet delay variation and packet loss. In the 4G standards some end-to-end data paths are bearers, in 5G they may be network slices. For each end-to-end data path, the communication network needs to provide a way to monitor these KPIs to ensure the SLA requirements are met, i.e., to monitor the actual KPI and determine if it is within the desired range of KPIs for that data path.

Ideally the data for calculating these KPIs would be measured at the application server (e.g., which typically resides on the Internet) and client (e.g., which typically resides on the mobile device). However, these type of measurements at the server and client are typically not available and/or not done. It would be useful if these measurements could be made from communication network nodes between the server and client, which are more accessible. It would also be useful if these measurements could be made in near real-time, particularly for applications running over the TCP/IP protocol.

SUMMARY

A method and apparatus are disclosed for monitoring wireless network performance, which can be done in near real-time for applications running over the TCP/IP protocol, by making measurements at an intermediate node in the wireless network. The intermediate node is connected between a wireless User Equipment (UE) device and an external network. Monitoring the performance of the wireless side of the network, between the intermediate node and the UE, can be very useful to the network operator that is operating the wireless network; particularly, metrics relating to the wireless side of the intermediate node can be useful in determining the extent to which the operator's service guarantees are being met. Although the following description is focused primarily on 4G LTE and 5G NR networks, the solution is useful for any communication network that connects a client and application server, or for any application running over TCP/IP protocol.

Various embodiments of a system for creating and measuring packet loss rate at an intermediate node in a packetized communications network, between a data sender (DS) and a data receiver (DR), are disclosed. In some embodiments, the packet-based communication session is a TCP/IP session. In one embodiment a method of measuring packet loss rates over an interval of a packet-based communication session includes generating a series of packets in the DS during the interval in the communication session, communicating the packets through the intermediate node to the DR, receiving the series of packets at the intermediate node during the interval, and storing data from each of the received packets. A Round Trip Time (RTT) is estimated for the packets; and the stored data is processed to measure packet loss rate responsive to the RTT estimate and the stored data. Processing the stored data includes, for each packet, extracting the TCP sequence number, determining the payload length, making an estimate of the RTT for the session, and comparing the received TCP sequence number with all TCP sequence numbers previously received. If there is a match with any previously received TCP sequence number, then a packet loss counter is incremented by 1. If there is not a match, then the scenario is determined responsive to the stored data, to classify the scenario. Classifying the scenario may include examining the received packet and stored data to determine where gaps exist in the stored data sequence, and whether the received packet fills one of the gaps.

Embodiments are also disclosed for measuring the packet loss rate and byte loss rate in the downlink direction over an interval in near real time, from a Network Source (NS) to a User Equipment (UE) device, in a simplified manner that does not require storing data from multiple previous packets in the interval. Other embodiments disclosed for measuring the packet loss rate and byte loss rate in the uplink direction over an interval in near real time, from the UE to the NS, also in a simplified manner that does not require storing data from multiple previous packets in the interval.

One advantage of monitoring loss as described herein on a near real-time basis is to determine if service guarantees are being met. If not, loss scenarios may be determined, and resolution mechanisms can be implemented, such as reconfiguring the network slices and the bearers to improve service and meet the service guarantees. Other actions such as network reconfiguration maybe be implemented, services for particular applications may be downgraded, or additional hardware can be installed to meet the service guarantees. More generally to determine if service guarantees have been met, the measured packet loss rate may be compared with a predetermined packet loss rate, and if the measured packet loss rate is greater than the predetermined packet loss rate, then a resolution mechanism is implemented to decrease the packet loss rate below the predetermined packet loss rate.

DETAILED DESCRIPTION (1) Introduction

Communication networks and system components are described herein using terminology and components common to 4G (LTE) communication systems, and/or 5G NR communication systems, using TCP/IP communication protocols. However, the principles of the communication network monitoring techniques described herein more widely apply to other communication systems, not only to 4G or 5G systems and TCP/IP communication protocols.

An implementation in the context of an enterprise or other private network may be described herein. Although sometimes described in the context of an enterprise network, the principles disclosed can also apply to any private network and more generally public networks. An enterprise network is one type of private network. Private networks are operated for use within a limited area by a limited group of authorized users, whereas public networks generally cover a larger area and are open for use by anyone that subscribes to the service by the network operator. An enterprise network is created at an enterprise location such as a warehouse, factory, research center or other building, and is usually operated by an organization for its own use. Other types of private networks may be operated by a private network manager for use by more than one organization.

(2) Overview

Methods and apparatus are disclosed herein to measure packet latency, packet delay variation and packet loss rate for end-to-end TCP/IP flows going through a communication network such as a 4G LTE network or a 5G NR network.

Figure 6:
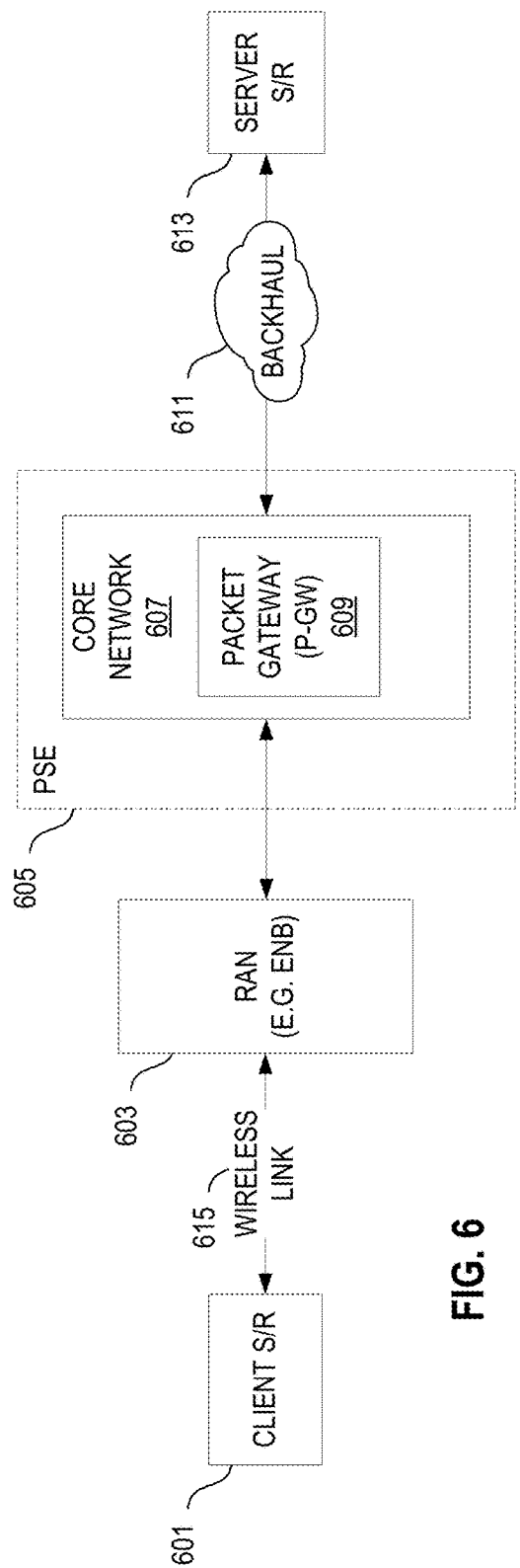
FIG. 6 is block diagram of a communication network including a Programmable Service Edge (PSE) and illustrating a data path through the PSE, between a sender (DS) and receiver (DR) pair.

Reference is made to FIG. 6 which is block diagram of a communication network illustrating a data path between a sender (e.g., server 613) and receiver (e.g., client UE 601) pair. The data path communication goes over a core network 607 (EPC or 5GC) that resides in a Programmable Service Edge (PSE) 605 and a Radio Access Network 603 (that includes an AP, eNB or gNB in the 5G NR case). The PSE 605 includes the core network 607 and other functionalities useful to operate and administer the network, depending upon the needs of the network. Typically, the PSE 605 is connected to a server S/R 613 through a wide area network or backhaul 611. Also, typically the RAN 603 which may include an eNB, is connected to the Client S/R 601 on the other side via a wireless link 615. In the specific description below, implementations are described as may be implemented in the PSE 605. As mentioned earlier, in general, the communication network does not need to be 4G or 5G, and it can be any IP network connecting the S/R pair (i.e., Client S/R 601 and Server S/R 613).

Figure 7:
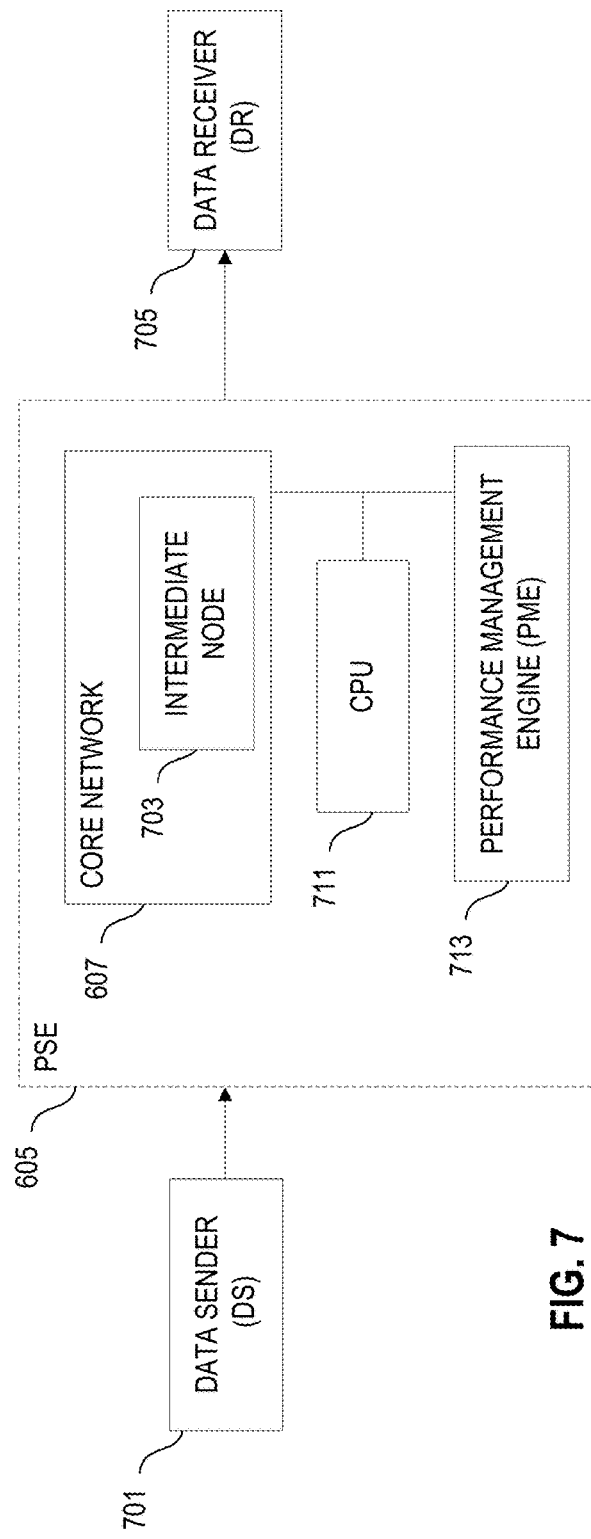
FIG. 7 is block diagram of a communication network including a Programmable Service Edge (PSE), illustrating an intermediate node in the PSE.

For purpose of description, the network in FIG. 6 is simplified in FIG. 7 to show an intermediate node 703 in the PSE 605 positioned between a Data Sender (DS) 701 (e.g., a UE) and a Data Receiver (DR) 705 (e.g., a server). It should be clear that the packets may travel through many other components and paths, and that during the normal course of communications, in one example the UE and the server may alternate roles as the DS and the DR.

The intermediate node 703 is located between the DS 701 and the DR 705, receiving and making observations of the packets. The intermediate node 703 receives a plurality of packets, some of which may be part of one session, and other packets may be part of another session. Based upon identifiers in the packets, the intermediate node 703 can identify each packet as being part of one session or another, and therefore the intermediate node 703 can select packets associated with only one session as appropriate.

Typically, the intermediate node 703 will be the Packet Gateway (P-GW) 609 in the PSE 605; however more generally any intermediate node between the S/R pair can be utilized. A P-GW (Packet Data Network Gateway) (PDN Gateway) provides connectivity from the UE to external packet data networks by being the point of exit and entry of traffic for the UE. A UE may have simultaneous connectivity with more than one PGW for accessing multiple PDNs. The PGW performs policy enforcement, packet filtering for each user, charging support, lawful interception, and packet screening. Another key role of the PGW is to act as the anchor for mobility between 3GPP and non-3GPP technologies such as WiMAX and 3GPP2 (CDMA 1× and EVDO).

As described herein, the intermediate node 703 in the PSE 605 (which may be termed the "PSE node") makes measurements on the TCP/IP packets moving between the S/R pair. Generally, the data from the intermediate node 703 may be analyzed by the PSE 605, or dedicated hardware, or general-purpose hardware such as a CPU 713 on the PSE 605, or elsewhere. In alternative embodiments, the packet capture measurements and some or all of the analytics are performed in a separate node connected to (co-located with) the P-GW 609 such as a Performance Measurement Engine (PME) 711 (which may be situated in the PSE 605 or alternatively on the cloud). For this implementation, the packets arriving at P-GW could be copied and transferred to the other node via a highly efficient mechanism such as DPDK (Data Plane Development Kit, see www.dpdk.org).

The measurement data is processed by the Performance Measurement Engine (PME) 711 for analytics, particularly the PME 711 can calculate the latency, packet delay variation (PDV), and/or packet loss rate (PLR), as described herein, and perform other analytics as appropriate. The PME 711 is also where the algorithm could be run for computing the Key Performance Indices (KPIs), responsive to the latency, PDV, and/or PLR, as appropriate for the particular implementation.

The system described herein provides a way to monitor and analyze communications and determine the extent to which the guarantees/promises of performance are being met by the network, as described in more detail with reference to FIG. 23. These guarantees/promises of network performance may be described in some embodiments by a range of Key Performance Indicators (KPIs), which are metrics that quantify specific aspects of a functioning network. Particularly at least one of the latency, PDV, and PLR can be determined on a near real-time basis, and then utilized to provide KPIs and consider possible loss scenarios. The network can then take steps to mitigate the losses as appropriate and provide the promised performance.

(3) TCP Timestamp Option Overview

To measure latency, one embodiment utilizes the TCP Timestamp option, which is defined in RFC 7323 [TCP Extensions for High Performance, RFC 7323, IETF, September 2014, https://tools.ietf.org/html/rfc7323] to make accurate Round Trip Time (RTT) measurements at both sender and receiver. The TCP Timestamp option is enabled by default on Linux [TCP Linux Man Page, http://man7.org/linux/man-pages/man7/tcp.7.html] and Windows servers [Description of Windows 2000 and Windows Server 2003 TCP Features, https://support.microsoft.com/en-us/help/224829/description-of-windows-2000-and-windows-server-2003-tcp-features].

The TCP Timestamp option is negotiated during TCP/IP's SYN (synchronize) handshake. TCP/IP's handshake is a three-way negotiation used to initiate and establish a communication session between a client (e.g., Data Sender 701) and a server (e.g., Data Receiver 705). For example, when a client requests a connection, it sends a SYN segment, which is a special TCP segment, to the server port. The SYN message includes the client's ISN (Initial Sequence Number). The server port responds with a SYN-ACK message, and the client then responds with an ACK message.

Figure 8:
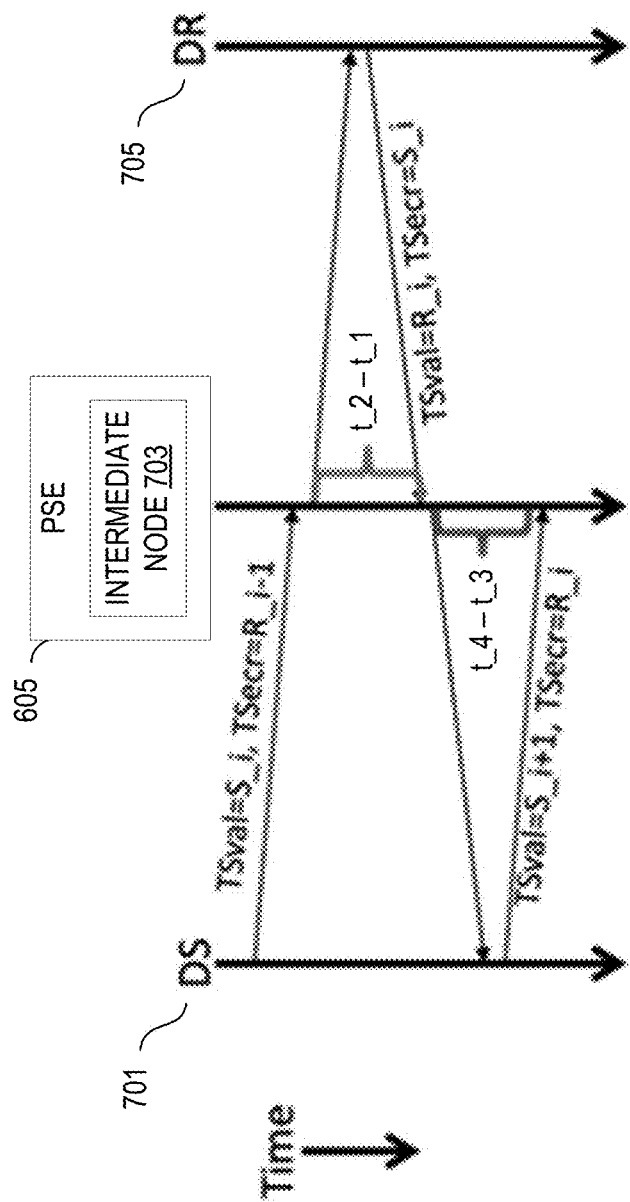
FIG. 8 is a packet flow diagram of communications between a DS and a DR, illustrating latency measurements at an intermediate node in the PSE.

Once negotiated, every TCP packet (in both directions) carries the 8-byte TCP Timestamp option that includes 4 bytes for the TSval (Timestamp value) field, and 4 bytes for the TSecr (Timestamp echo reply) field. The receiver of a TCP packet echoes the sender's TSval in the corresponding TSecr field (FIG. 8). Thus, the TSval value in each direction continues to increase in value over time.

(4) Latency Measurement

Figure 9:
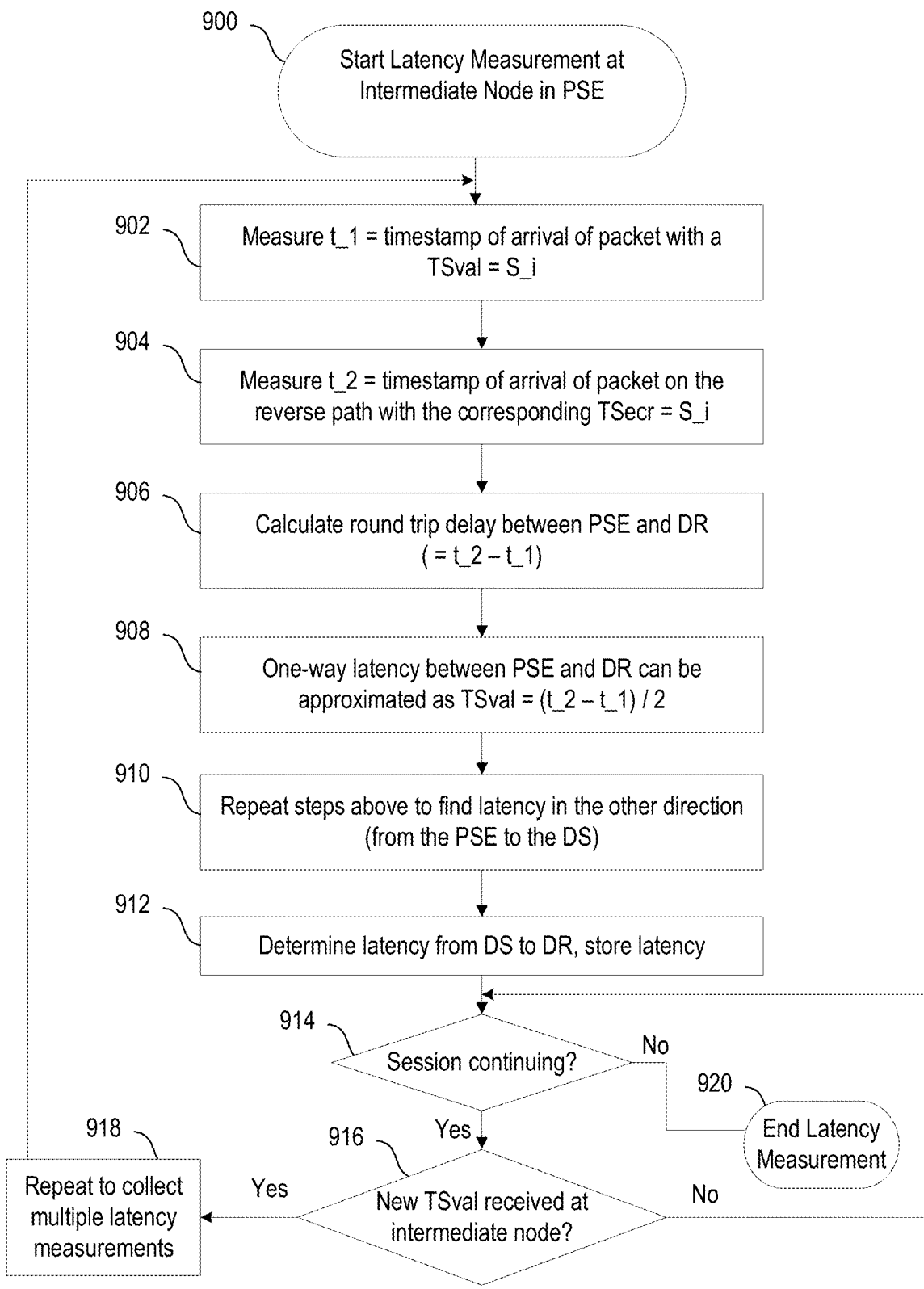
FIG. 9 is a flow chart illustrating operations for performing the latency measurement between the DS and the DR.

FIGS. 8 and 9 illustrate a latency measurement technique described herein. FIG. 8 is a packet flow diagram of communications between a Data Sender 701 and a Data Receiver 705, illustrating latency measurement at an intermediate note 703 (FIG. 7) in the PSE 605. FIG. 9 is a flow chart illustrating the steps for performing the latency measurement between the DS 701 and the DR 705. FIGS. 8 and 9 will be referenced together in the following discussion.

By observing the TSval (Timestamp Value) and TSecr (Timestamp echo reply) values on both directions of the packet flow from the intermediate node 703, the PSE 605 can identify the transmitted and reply packets and track latency between the PSE 605 to the DR 705, and between the PSE 605 back to the DS 701. From a high-level viewpoint, beginning at the start (STEP 900) the steps to measure latency at the intermediate node of the PSE 605, between the DS 701 and the DR 705, of a packet with an index i, are as follows:
1) Let Track t_1=timestamp, at the intermediate node, of arrival of a packet with a particular TSval=S_i (STEP 902);
2) Let Track t_2=timestamp, at the intermediate node, of arrival of the return packet received on the reverse path from the DR 705, which has corresponding TSecr=S_i (STEP 904);
3) calculate the forward (from the PSE) direction round trip delay between the PSE 605 and DR 705 as TSval=t_2−t_1 (STEP 906);
4) approximate the one-way forward latency between the PSE 605 and DR 705 as TSval=(t_2−t_1)/2 (STEP 908).

The method is next applied looking in the backward (second) direction (STEP 910), to find latency on the opposite side of the intermediate node of the PSE 605. For example on the opposite side of the PSE 605, t_3 is observed to be the intermediate node's timestamp of arrival of the packet with a TSval=R_i, and t_4 is observed to be the intermediate node's timestamp of arrival of the return packet with a TSecr=R_i, then the round trip delay between the PSE 605 and the DS 701 can be calculated as t_4−t_3, and the reverse latency (between the PSE 605 and the DS 701) can be approximated as (t_4−t_3)/2.

The forward latency and reverse latency can then be processed (e.g., added together) to provide the overall round trip latency (RTT) between the DS 701 and the DR 705, and stored at an appropriate location. (STEP 912).

While a communication session is continuing (STEP 914), this method can be repeated every time a new TSval is observed on the flow (STEP 916) so that multiple latency measurements can be collected during the duration of the flow (STEP 918). These multiple latency measurements can be processed (e.g., averaged to provide an average RTT). When the communication session is complete, the process ends (STEP 920).

(5) Packet Delay Variation Measurement

Figure 10:
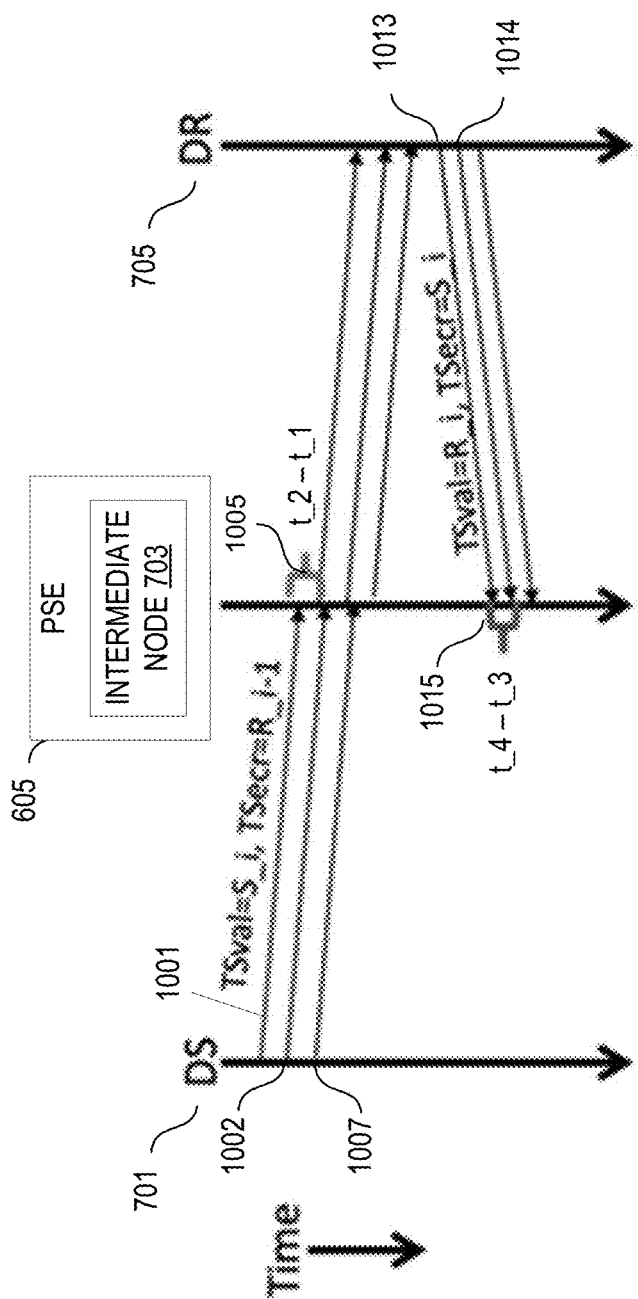
FIG. 10 is a packet flow diagram showing session communications between a DS and a DR, illustrating a Packet Delay Variation (PDV) measurement using a TCP Timestamp Option at an intermediate note in the PSE.
Figure 11:
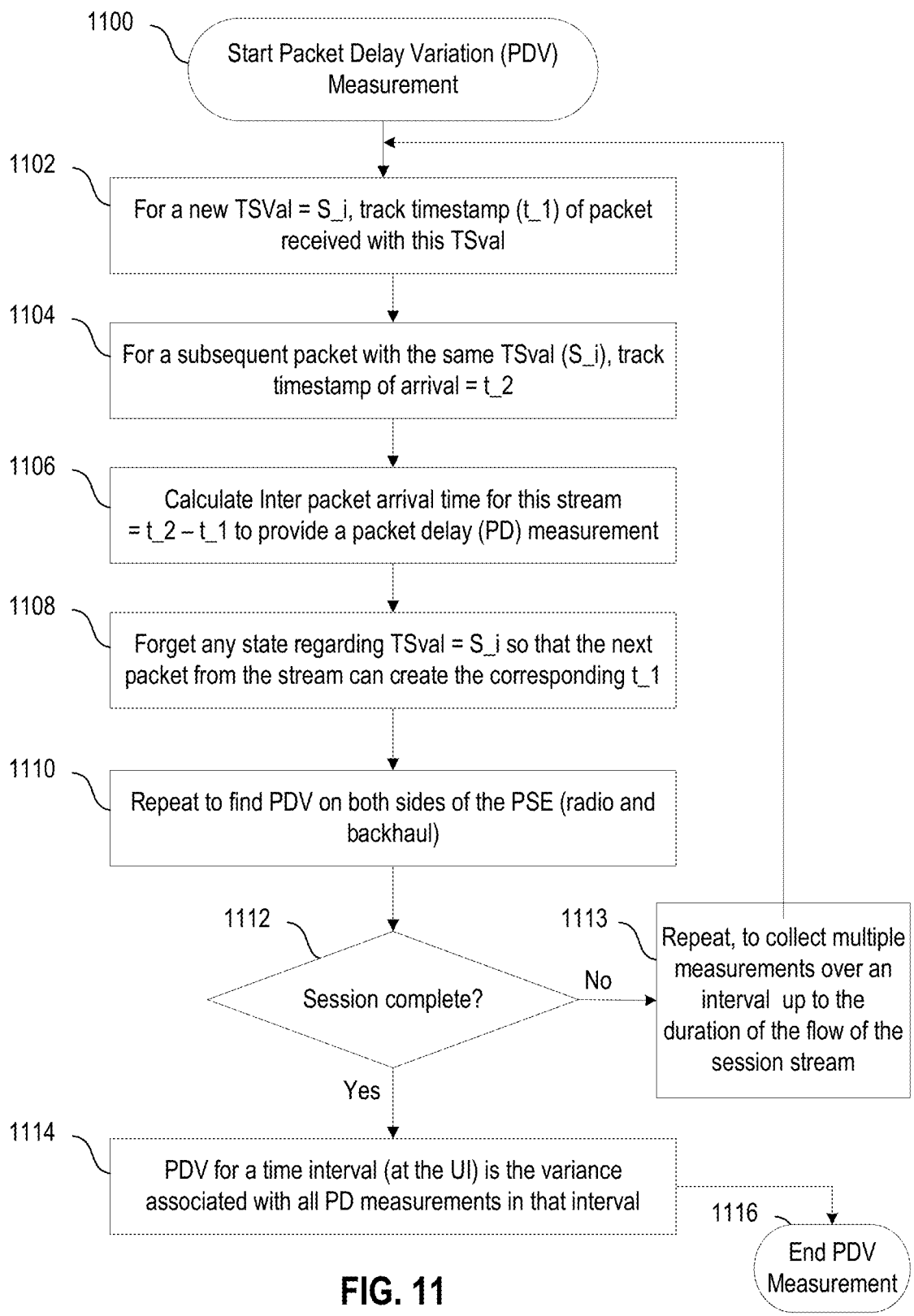
FIG. 11 is a flow chart illustrating operation for performing the PDV measurement between the DS and the DR.

FIGS. 10 and 11 illustrate the Packet Delay Variation (PDV) measurement technique. FIG. 10 is a packet flow diagram showing session communications between a Data Sender 701 and a Data Receiver 705. FIG. 10 illustrates PDV measurement at an intermediate note 703 (FIG. 7) in the PSE 605. FIG. 11 is a flow chart illustrating the steps for performing the PDV measurement between the DS 701 and the DR 705. FIGS. 10 and 11 will be referenced together in the following discussion.

Packet Delay Variation (PDV) is the variation in packet delay within a stream of session packets, i.e., packets from the same session. See e.g., IP Packet Delay Variation Metric for IP Performance Metrics (IPPM), RFC 3393, IETF, https://tools.ietf.org/html/rfc3393, November 2002. Using a PDV measurement, we can use the observation that multiple packets with the same TSval are most likely transmitted back-to-back from the sender and hence can form the packet stream for calculating the PDV. The packets sent back-to-back (FIG. 10) will most likely arrive back-to-back at the PSE. Variation in the inter-packet arrival time of these packets provides the packet delay variation. Following are steps of this method to measure PDV (STEP 1100) at an intermediate node 703 of the PSE 605:
1) For a new TSval=S_i, track the timestamp (t_1) of a session packet 1001 received (at the intermediate node 703 with this TSval (STEP 1102);
2) For a subsequent session packet 1002 with the same TSval (S_i), track the timestamp of arrival=t_2 (STEP 1104);
3) Calculate inter-packet arrival time 1005 for this stream=t_2−t_1 at the intermediate node (STEP 1106);
4) To make the next PD measurement, disregard any previous state regarding TSval=S_i so that the next packet 10 07 from the stream will create the corresponding t_1 (STEP 1108). This method is repeated every time new TSval is observed on the session flow so multiple measurements can be collected for the duration of the flow.

This method can be applied to find the PDV on both sides of PSE (radio and backhaul). In other words, the same measurement technique can be applied looking in the backward (second) direction (STEP 1110), to make a PD measurement on the opposite side of the intermediate node of the PSE 605. For example, on the opposite side of the PSE 605, if t_3 is observed to be the timestamp of the packet 1013 with a TSval=R_i, and t_4 is observed to be the intermediate node's timestamp of the next packet 1014 with a TSecr=R_i, then the PD measurement 1015 with the DS 701 can be calculated as t_4−t_3.

While a communication session is continuing (STEP 1112), this method is repeated (STEP 1113) every time a new TSval is observed on the flow so that multiple PD measurements are collected during the duration of the flow.

The PDV for a time interval (at the UI) is the variance associated with all PD measurements over that interval. When the communication session is complete or ends for some other reason the PDV can be calculated (STEP 1114), and the process the ends (STEP 1116).

(6) Packet Loss Rate Measurement using TCP Sequence Numbers

FIGS. 12, 13A, 13B, 13C, 14A-14H collectively illustrate a Packet Loss Rate (PLR) measurement technique.

Figure 12:
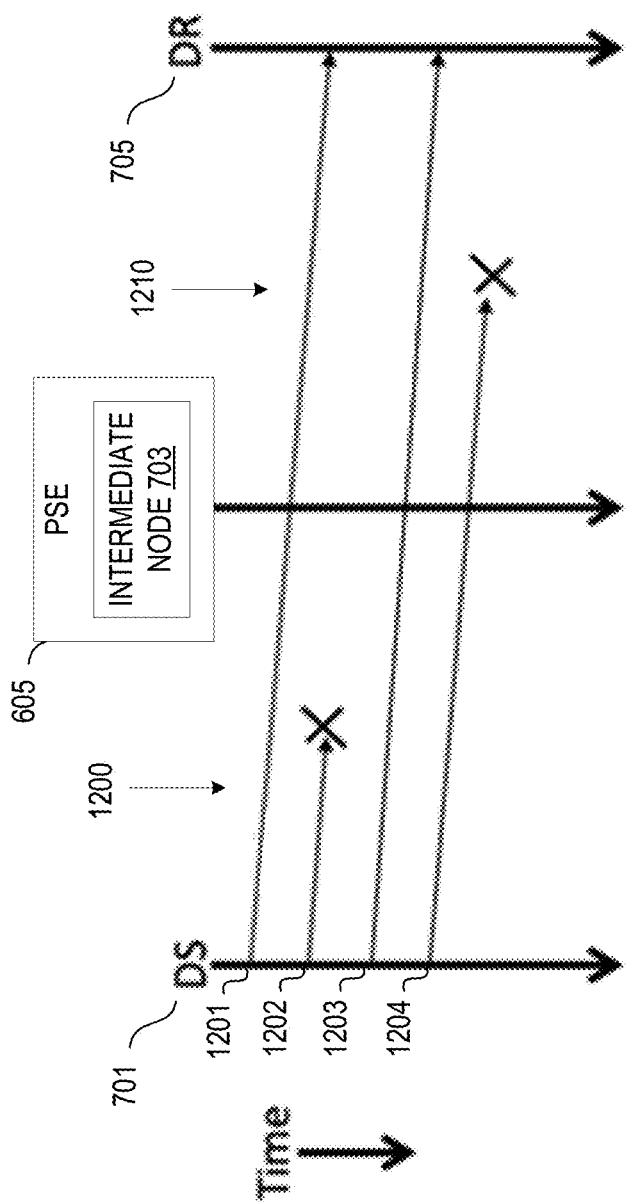
FIG. 12 is a packet flow diagram showing a first series of packets flowing from the DS to the intermediate node in the PSE, and a second series of retransmitted packets flowing from the intermediate node in the PSE to the DR, showing a Packet Loss Rate measurement at intermediate node in the PSE.

FIG. 12 is a packet flow diagram showing a first series of packets 1200 flowing from the Data Sender (DS) 701 to the intermediate node 703 (FIG. 7) in the Programmable Service Edge (PSE) 605, and a second series of retransmitted packets 1210 flowing from the intermediate node in the PSE 605 to the Data Receiver (DR) 705. As shown in FIG. 12, four packets 1201, 1202, 1203, 1204 in the first packet series 1200 are transmitted in sequence from the DS 701; however in this example the second packet 1202 does not actually arrive at the PSE 605, while the first, third, and fourth packets 1201, 1203, 1204 are received at the PSE 605. More generally, due to a variety of causes, some of the packets transmitted from the DS 701 may not be received at the PSE 605. The received first, third, and fourth packets 1201, 1203, 1204 are re-transmitted by the PSE 605; however, only the first and third packets 1201, 1203 are received by DR 705, and the fourth packet 1204 is lost.

According to TCP/IP protocol, each of the packets 1201, 1202, 1203, 1204 is sent with a TCP sequence number (tcp_seqno) that identifies its place in the sequence. Particularly, in TCP/IP, a 32-bit sequence number is used to keep track of how much data has been sent. This sequence number is included on each transmitted packet and acknowledged by the opposite host as an acknowledgement number to inform the sending host that the transmitted data was received successfully. When a host initiates a TCP session, its initial sequence number is effectively random; it may be any value between 0 and 4,294,967,295, inclusive.

This TCP sequence number is monitored when the packet is received at the PSE 605 and the DR 705, to identify which packets have been received, and therefore to determine which packets have been lost; i.e., the Packet Loss Rate (PLR) measurement technique estimates loss counts within a session flow based on TCP sequence numbers observed at the PSE 605, as will be described. Based upon these loss counts and an RTT measurement, PLR can be determined.

The technique utilizes an estimate for the session flow's RTT (which can be obtained using the latency measurement techniques described with reference to FIGS. 8 and 9) to determine whether an observed out-of-sequence packet is a retransmission or an out-of-order packet. Advantageously, the solution does not require the TCP Ack packets that might otherwise be necessary to track loss counts, and hence requires less resources to operate (e.g., is lighter on the implementation footprint) and can be faster. The solution can track both types of loss counts (i.e., loss counts on both sides of the intermediate node)—(i) the loss between the DS 701 and PSE 605 and (ii) the loss between the PSE 605 and the DR 705 (FIG. 12). Depending on where the radio link is situated (i.e., whether the radio link is the DS or the DR), an estimate can be made of the loss rate on the radio side; e.g., if a UE 101 (FIG. 1) is the DS 701, then the loss rate on the DS side is the loss rate on the radio side.

Figure 15:
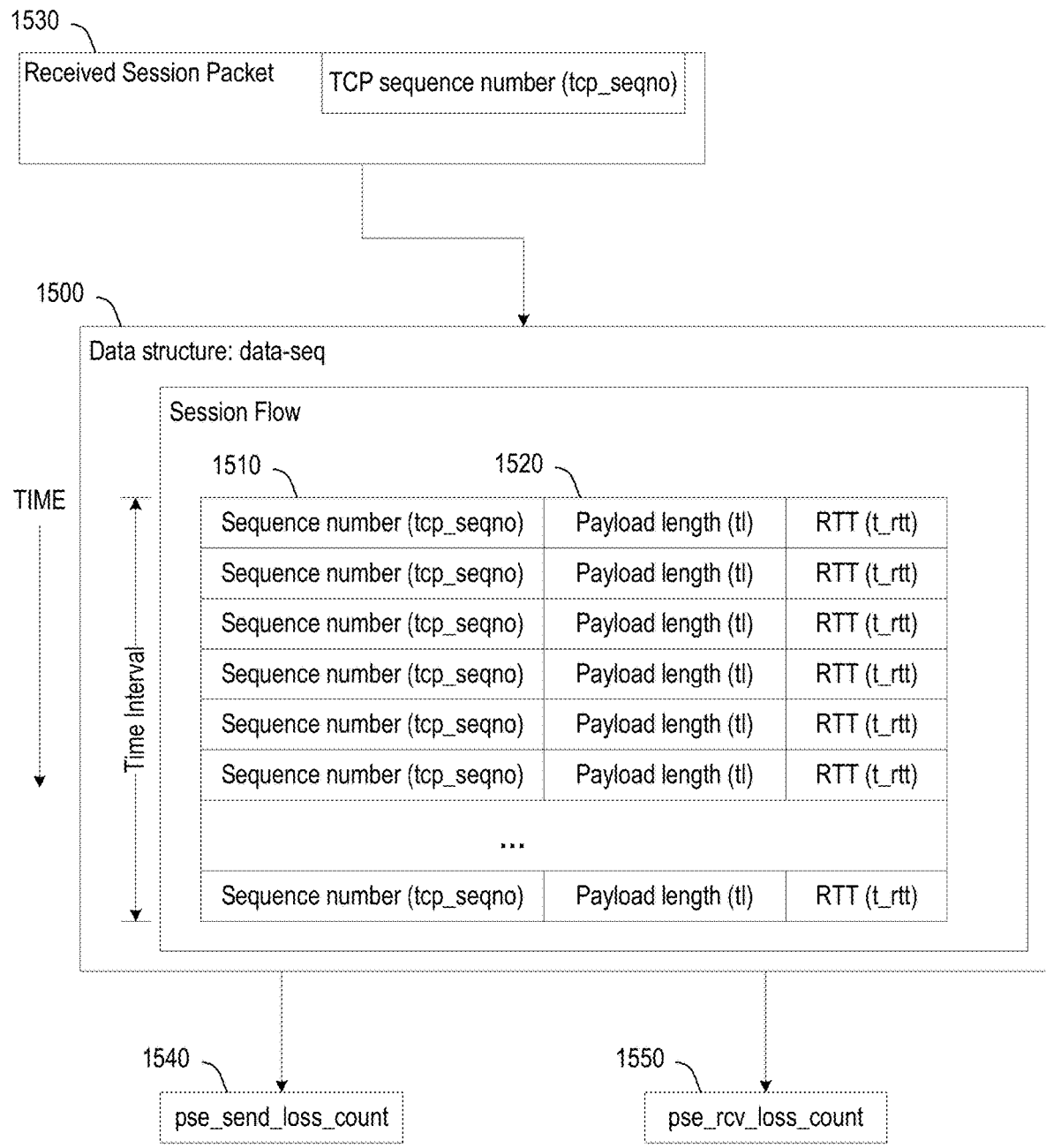
FIG. 15 is a block diagram including a main data structure, termed "data_seq" that tracks the session flow's sequence gaps, as observed at the PSE, and also illustrating a received packet and loss counters.

FIG. 15 is a block diagram illustrating, at a high level, stored data in a main data structure 1500, termed "data_seq", which is defined to track the session flow's cumulative sequence number 1510 and sequence gaps, as observed at the intermediate node 703 in the PSE 605. The data structure data_seq 1500 is sorted by sequence numbers 1510 (lowest at first).

The data structure data_seq also stores the byte length (payload length) 1520 associated with each block (e.g., the length, in bytes, of the TCP payload), which is described in more detail elsewhere.

FIG. 15 also shows a received session packet 1530 including a TCP sequence number, and loss counters pse_rcv_loss_count 1540 and pse_send_loss_count 1550.

Figure 13A:
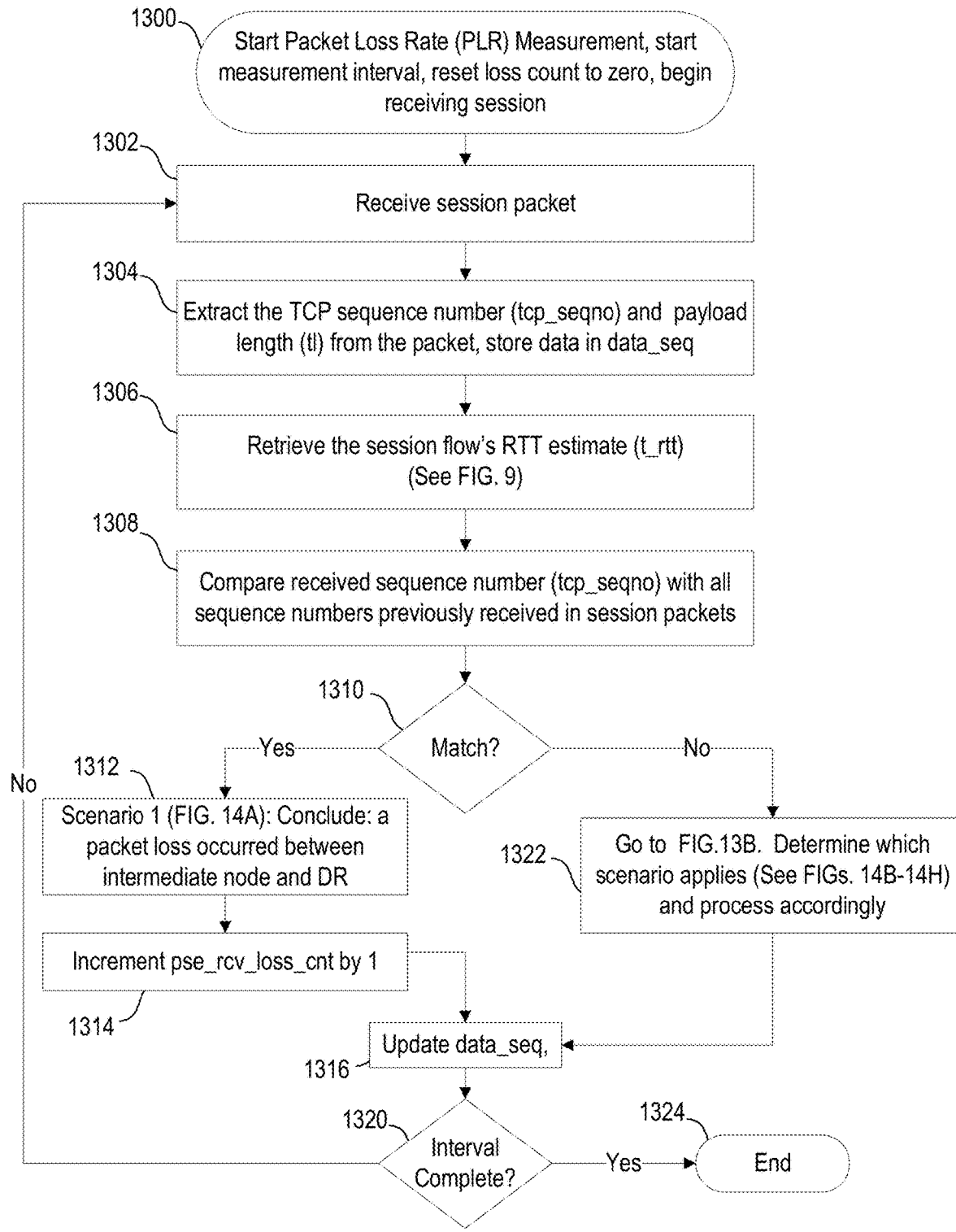
FIG. 13A, FIG. 13B, and FIG. 13C are flow charts that combine to show a flow chart of operations to make PLR measurements, depending upon the scenario existing in the data structure.
Figure 13B:
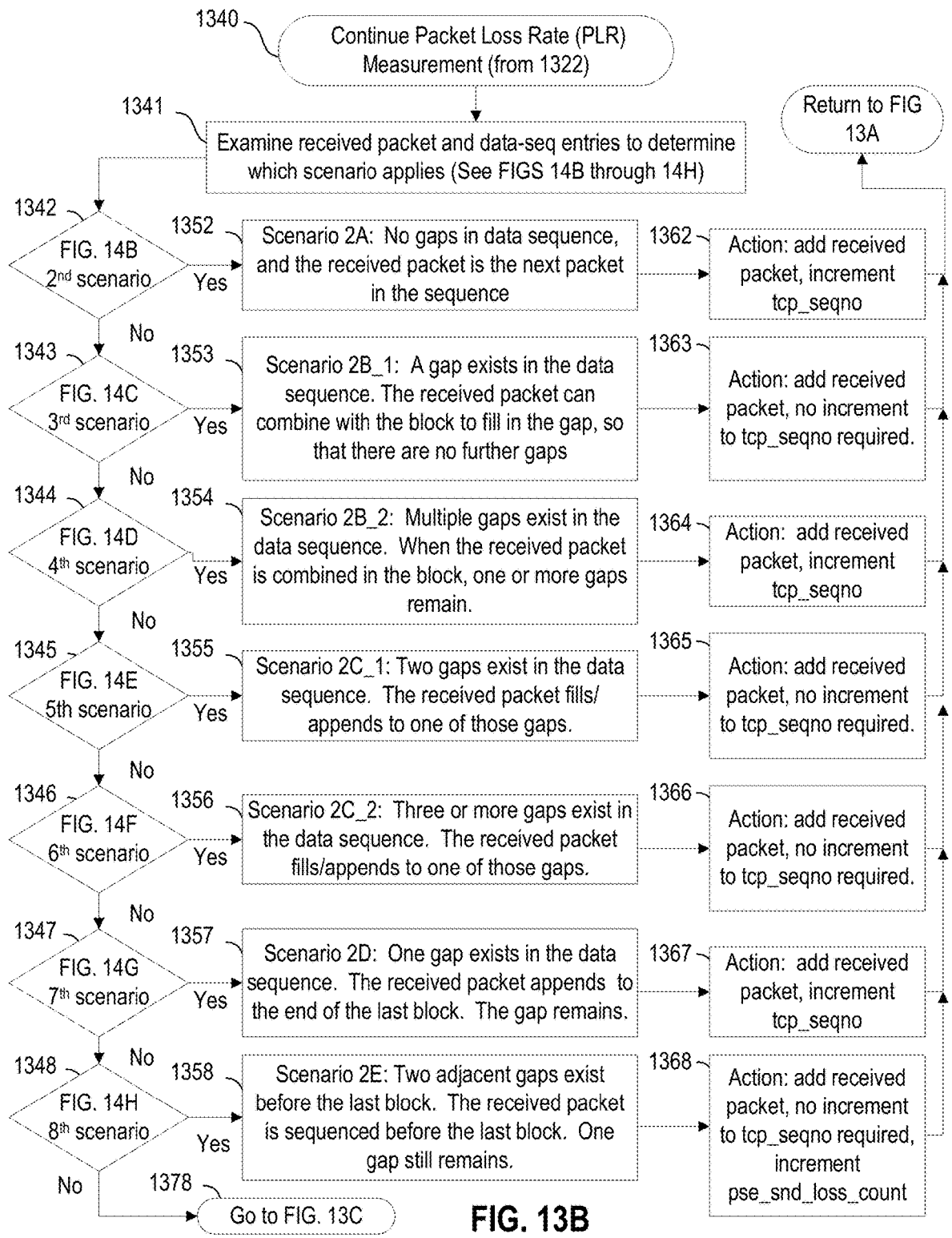
Figure 13C:
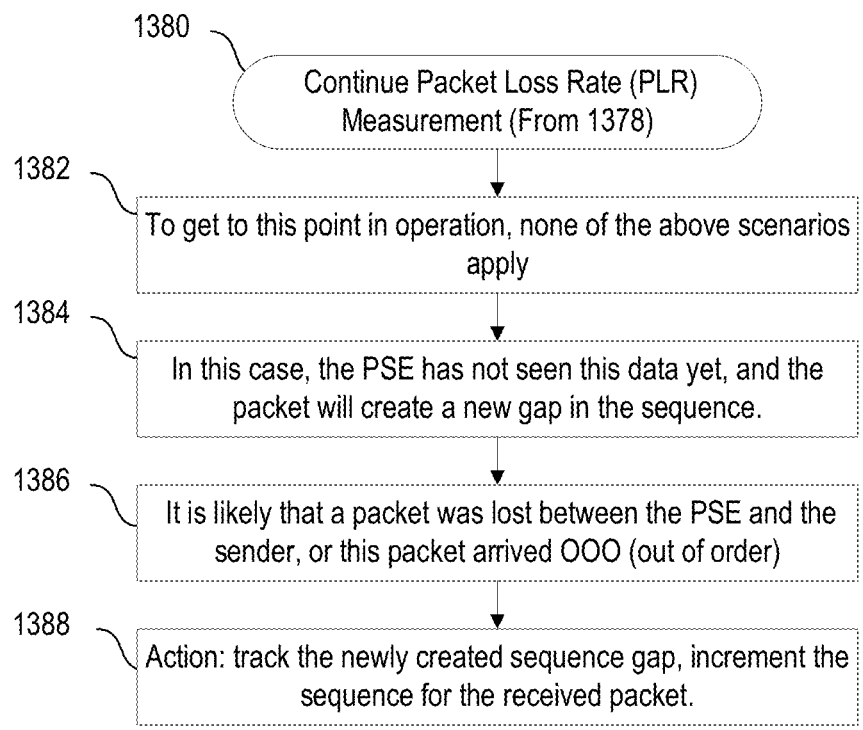

FIGS. 13A, 13B, and 13C are combined flow charts of operations to make PLR measurements.

FIG. 13A is a flow chart of operations to make PLR measurements. To start Packet Loss Rate (PLR) measurement (STEP 1300), the measurement interval is set, loss counters (pse_rcv_loss_count 1540 and pse_send_loss_count 1550) are reset to zero, the session begins, a session packet 1530 is received (STEP 1302), and the following steps are performed for each data packet in the TCP/IP session flow arriving at the PSE 605.

1) The TCP sequence number (tcp_seqno) and TCP payload length (tl) are extracted (STEP 1304) from the received packet, and are stored in the data structure data_seq 1500.

2) The flow's RTT estimate (t_rtt) is retrieved (STEP 1306). Note that RTT can be estimated during the latency measurements specified elsewhere herein, such as with reference to FIGS. 8 and 9.

3) Next, the received TCP sequence number is compared with all the sequence numbers previously received in the session packets (STEP 1308). If the PSE 605 has already seen the TCP sequence number, (STEP 1310) then there is a match, and it can be concluded that a duplicate packet has been received. In that instance it can be concluded that the received packet is a retransmission due to a loss that happened after the intermediate node 703, i.e., the loss happened between the intermediate node and the DR 705. In that case, the receiving end loss counter field (pse_rcv_loss_cnt) is incremented (by 1) (STEP 1314), the data structure data_seq is updated (STEP1316) and measurement then ends for that packet.

4) If the time interval over which the session packets are examined is not yet complete (STEP 1320), then the process repeats (returns to STEP 1302) for the next packet; otherwise, if the interval is over, the process ends (STEP 1324).

5) Returning to STEP 1310, if there is no match of the received packet with a previous packet (i.e., the packet is not a duplicate), then the received packet and the entries in data_seq 1500 are examined to classify the scenario and thereby determine which of various possible scenarios apply (STEP 1322). These scenarios are discussed below with reference to FIG. 13B and FIGS. 14A-14H. The data structure data_seq 1500 is then updated, depending upon which scenario applies (as shown in FIGS. 13B and 13C, discussed below).

6) Also, the packet loss field pse_snd_loss_cnt 1540 will be incremented as applicable, e.g., when a loss is determined to have occurred between the sender DSO 701 and the PSE node 605, such as a gap.

Figure 3:
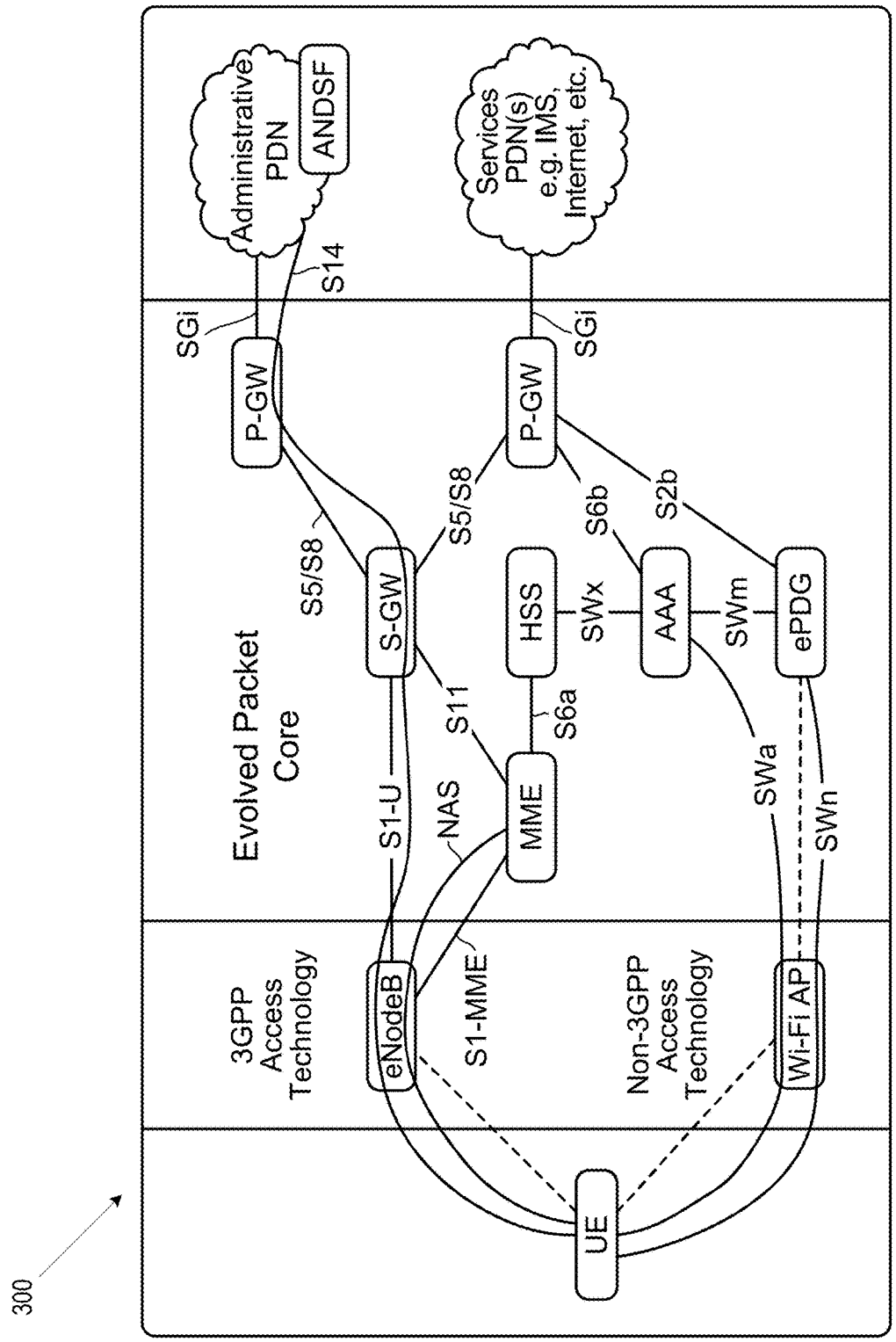
FIG. 3 is a block diagram of a 4G architecture in which bearers are illustrated by their letter symbols and lines connecting components.
Figure 4:
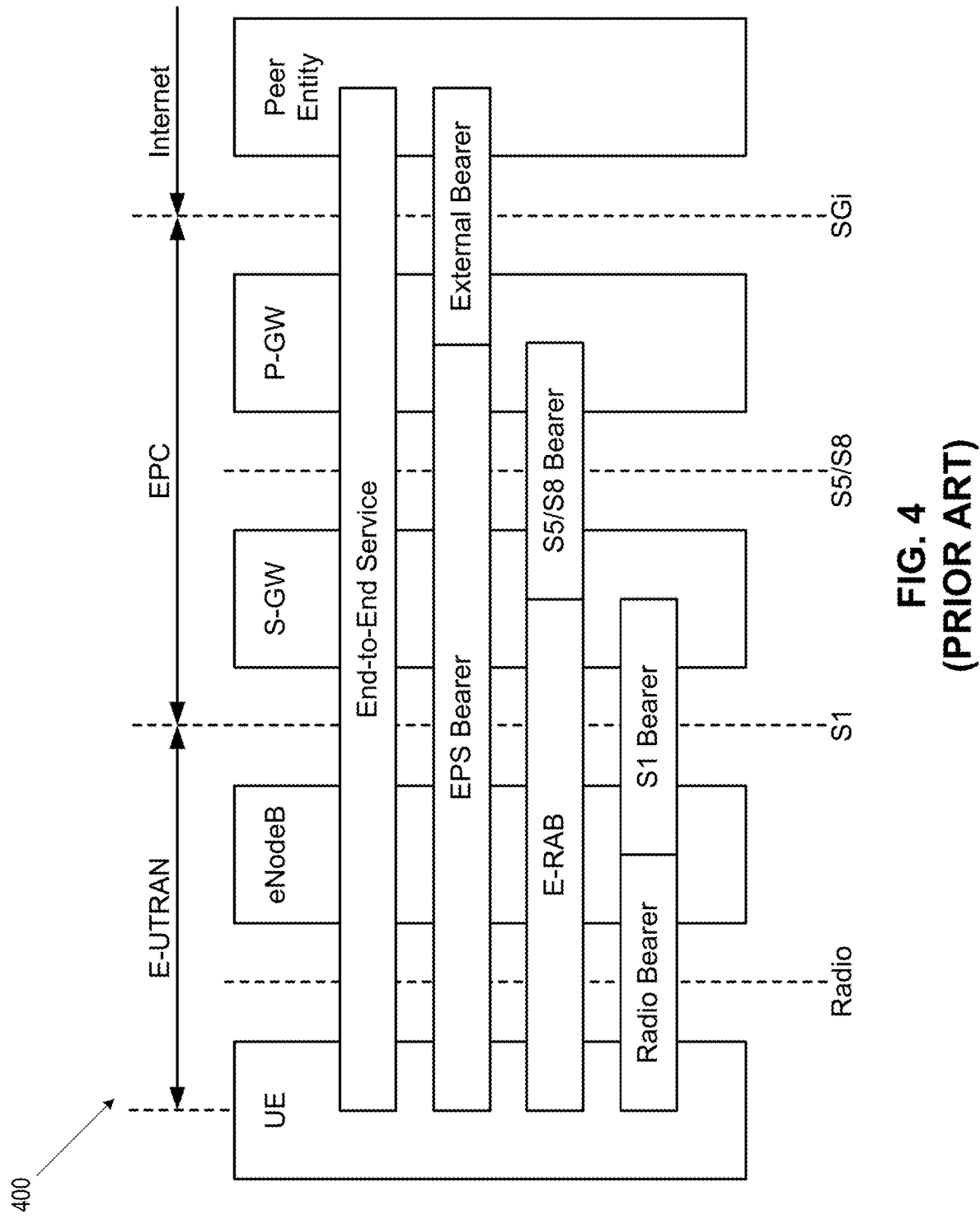
FIG. 4 is a block diagram of a 4G architecture in which the bearers are illustrated by name type and by paths between components blocks.
Figure 5:
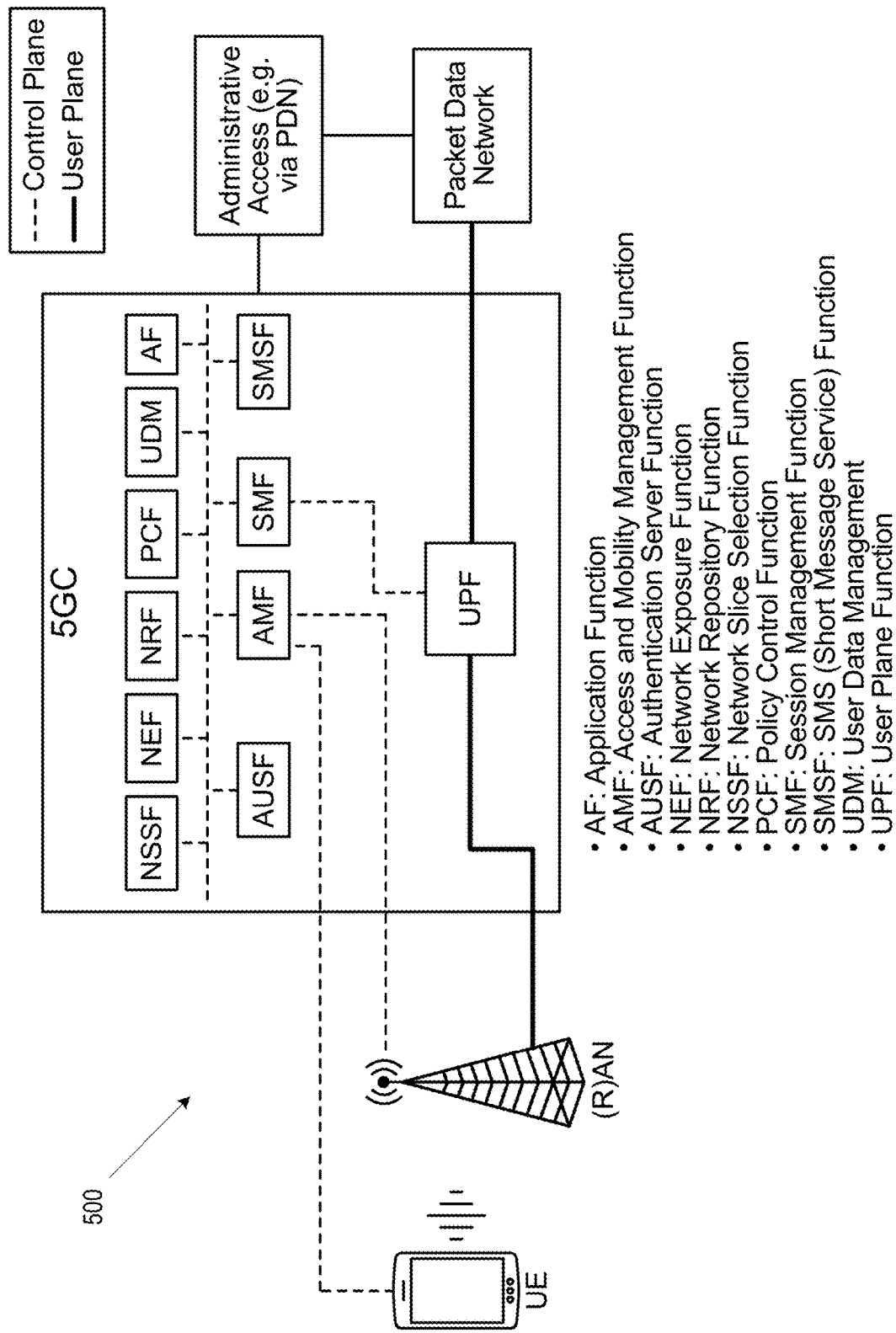
FIG. 5 is a block diagram of a 5G wireless communication network.

FIGS. 13B and 13C are flow charts of continued operations (1340) to make a PLR measurement at the PSE 605. FIG. 13B begins (STEP 1340) to continue operations from STEP 1322 (FIG. 3A). At the next step (STEP 1341) the received packet and the entries in the data structure 1500 are examined to determine which scenario (FIGS. 14B-14H) applies. Then based upon which of the scenarios apply (STEP 1341), a series of decisions are made. Particularly, FIGS. 14A-14H illustrate the various scenarios, depending upon the state of the data structure data_seq 1500, and the received packet that may be encountered, and these states correspond to decisions in STEPS 1342 through 1348 in FIG. 13B. These scenarios are described below with reference to FIG. 14A, followed by the corresponding steps taken for each scenario, described with reference to FIG. 13A, 13B, or 13C.

Figure 14A:
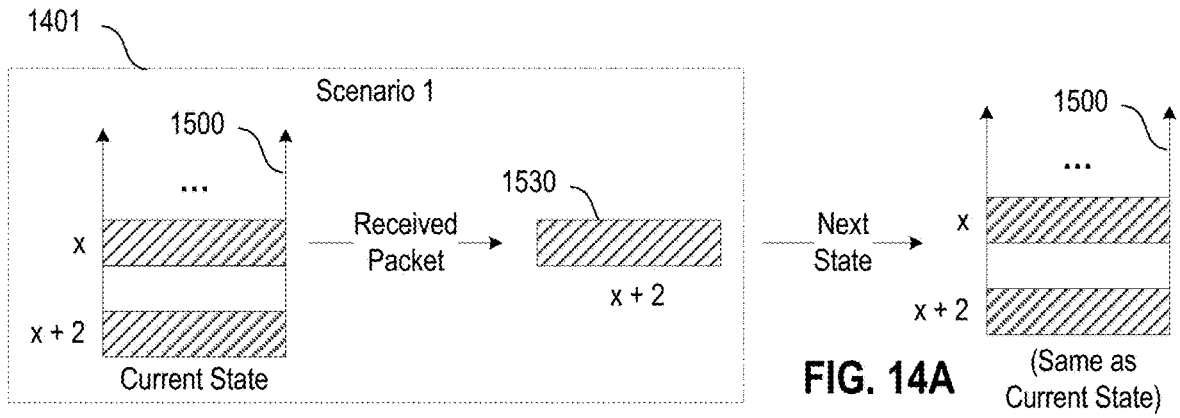
FIG. 14A illustrates a first scenario that may be encountered in the data structure.

FIG. 14A: In the first scenario 1401 (observed scenario 1), the current state of the data structure 1500 shows previously received packets as having TCP sequence numbers x and x+2. The most recently received packet is x+2, which is the same as that previously received, therefore the received packet is a retransmission of a previously-sent packet. Steps taken for this scenario have been discussed with reference to FIG. 13A, particularly steps 1312 and 1314, including incrementing the loss counter pse_rcv_loss_cnt.

Figure 14B:
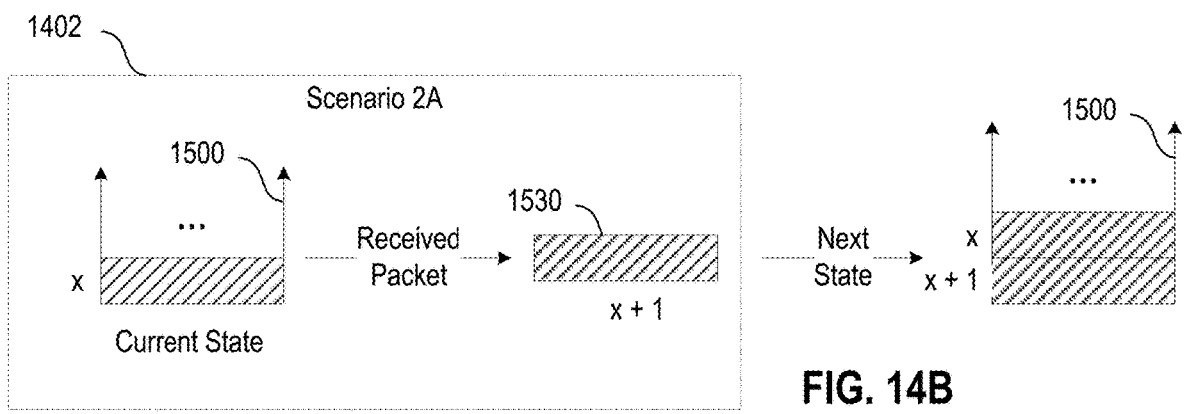
FIG. 14B illustrates a second scenario that may be encountered in the data structure.

FIG. 14B: In the second scenario 1402 (observed scenario 2A), the current state of the data structure 1500 shows the previously received packet as having TCP sequence number x. The most recently received packet is x+1. In FIG. 13B, when this second scenario is met (STEP 1342), there are no gaps in the data sequence, and the received packet 1530 is the next packet in the sequence numbers (STEP 1352). Then (STEP 1362), the received packet is added to the data structure 1500, and the cumulative sequence number (cum_seq) is incremented.

Figure 14C:
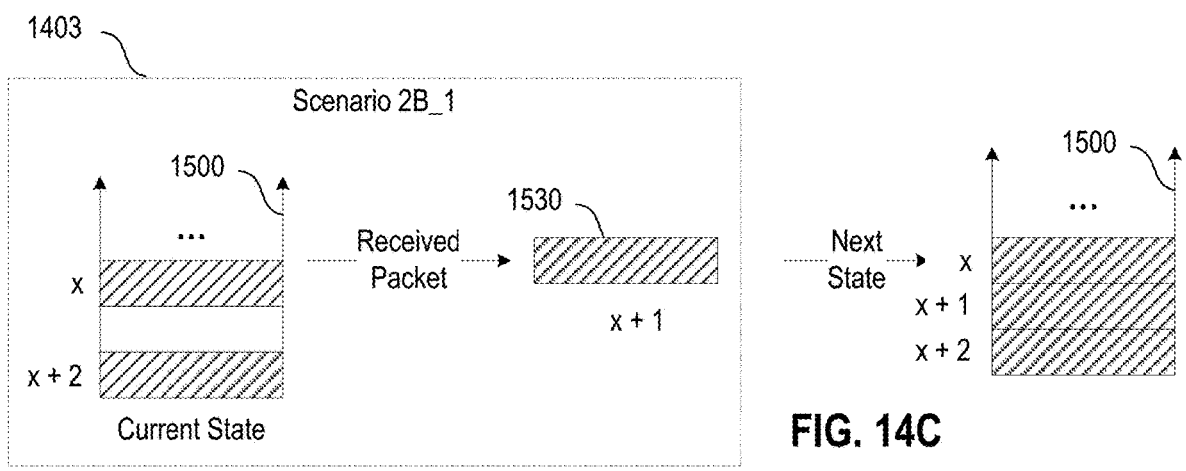
FIG. 14C illustrates a third scenario that may be encountered in the data structure.
Figure 14D:
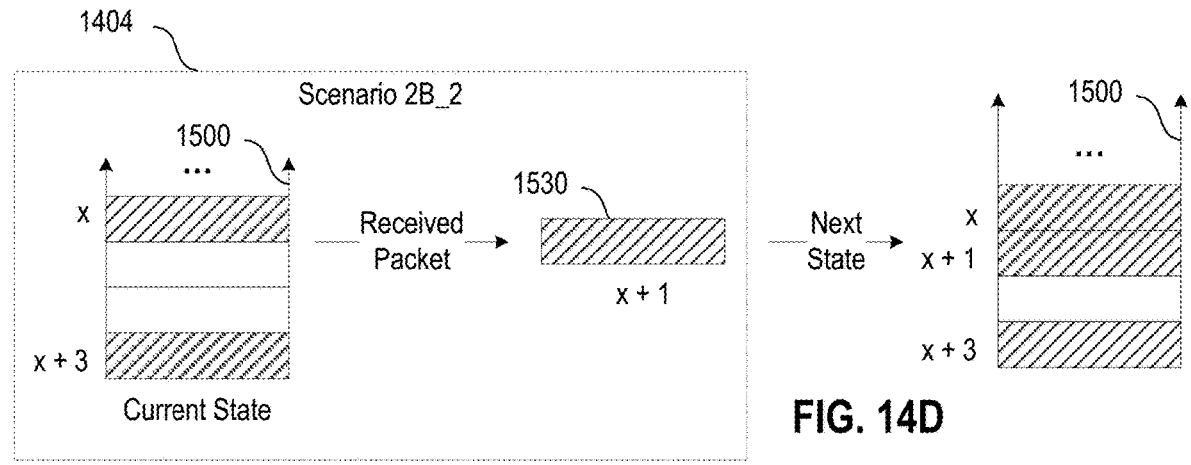
FIG. 14D illustrates a fourth scenario that may be encountered in the data structure.

In FIGS. 14C and 14D (observed scenarios 2B_1 and 2B_2) there are gaps in the data_seq, in which case the received packet 1530 is likely a retransmission, and the packet loss likely happened between the PSE and DS.

FIG. 14C: In the third scenario 1403 (observed scenario 2B_1), the current state of the data structure 1500 shows the previously received packets as having TCP sequence numbers x and x+2. The most recently received packet is x+1. In FIG. 13B, when this third scenario is met (STEP 1343), a gap exists in the data sequence (STEP 1353), and the received packet 1530 can combine with the block to fill in the gap, so that there are no further gaps. In this case, the received packet is added (STEP 1363), and the new data in the received packet 1530 fills the gap and combines with the next block. The next block will already be the new cum_seq (i.e., it is not necessary to increment cum_seq).

FIG. 14D: In the fourth scenario 1404 (observed scenario 2B_2), the current state of the data structure 1500 shows the previously received packets as having TCP sequence numbers x and x+3. The most recently received packet is x+1. In FIG. 13B, when this fourth scenario is met (STEP 1344), multiple gaps exist in the data sequence (STEP 1354), and when the received packet 1530 combines with the block, gaps remain. In this case, the received packet is added (STEP 1364) to fill one of the gaps, and since the new data does not combine with the block following it, we need to advance (i.e., increment) cum_seq.

Figure 14E:
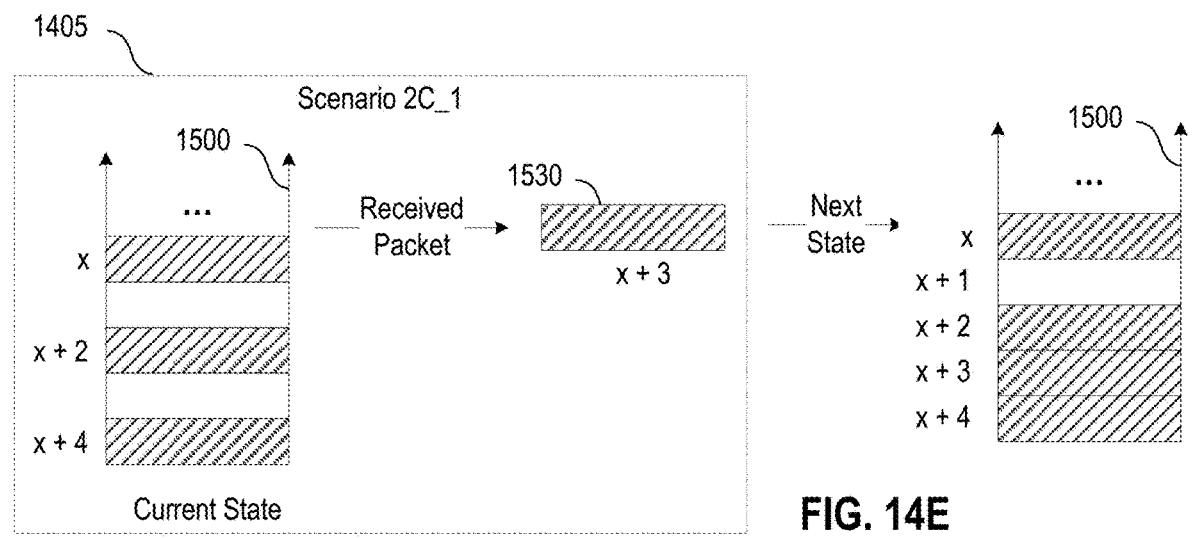
FIG. 14E illustrates a fifth scenario that may be encountered in the data structure.
Figure 14F:
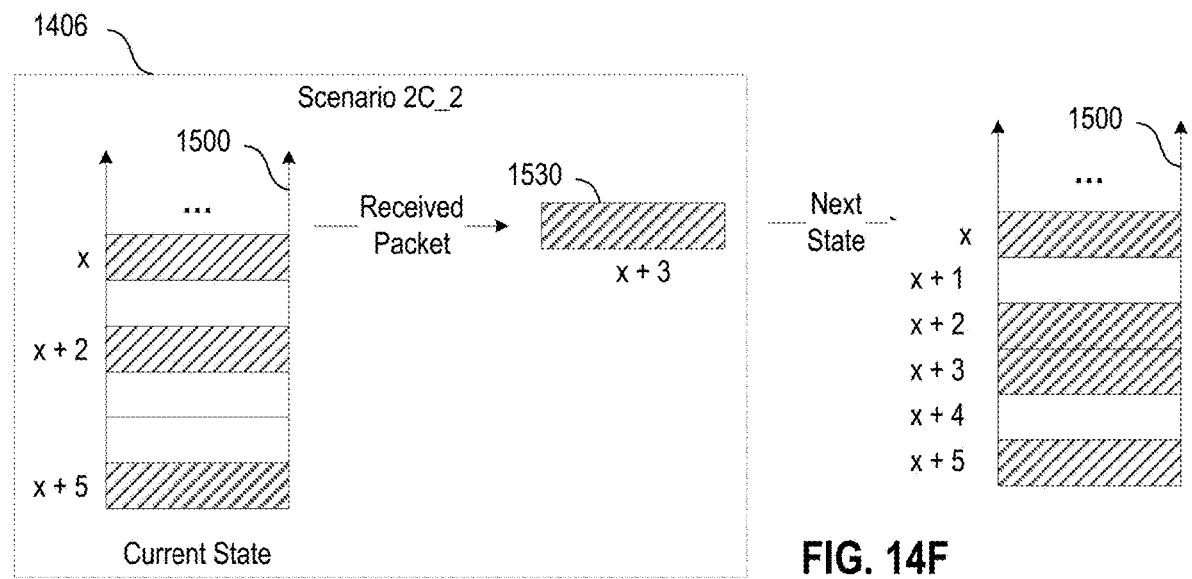
FIG. 14F illustrates a sixth scenario that may be encountered in the data structure.

In FIGS. 14E and 14F (observed scenarios 2C_1 and 2C_2), which are variations of each other, there are gaps in the data_seq that remain even after the received packet is added to the data_seq, in which case the received packet 1530 fills/appends one of the gaps. This packet is a likely a retransmission for loss between PSE and DS.

FIG. 14E: In the fifth scenario 1405 (observed scenario 2C_1), the current state of the data structure 1500 shows the previously received packets as having TCP sequence numbers x, x+2, and x+4. The most recently received packet is x+3. In FIG. 13B, when this fifth scenario is met (STEP 1345), two gaps exist in the data sequence (STEP 1355), and the received packet fills/appends a gap in the middle. This received packet is a retransmission for loss between PSE and DS. In this case, the received packet is added, and no increment to the sequence number is required.

FIG. 14F: In the sixth scenario 1406 (observed scenario 2C_2), the current state of the data structure 1500 shows the previously received packets as having TCP sequence numbers x, x+2, and x+5. The most recently received packet is x+3. In FIG. 13B, when this sixth scenario is met (STEP 1346), three (or more in some cases) gaps exist in the data sequence (STEP 1356), and the received packet fills/appends a gap in the middle. This received packet is a retransmission for loss between the PSE and DS. The received packet is added (STEP 1366) and no increment to the sequence number is required.

Figure 14G:
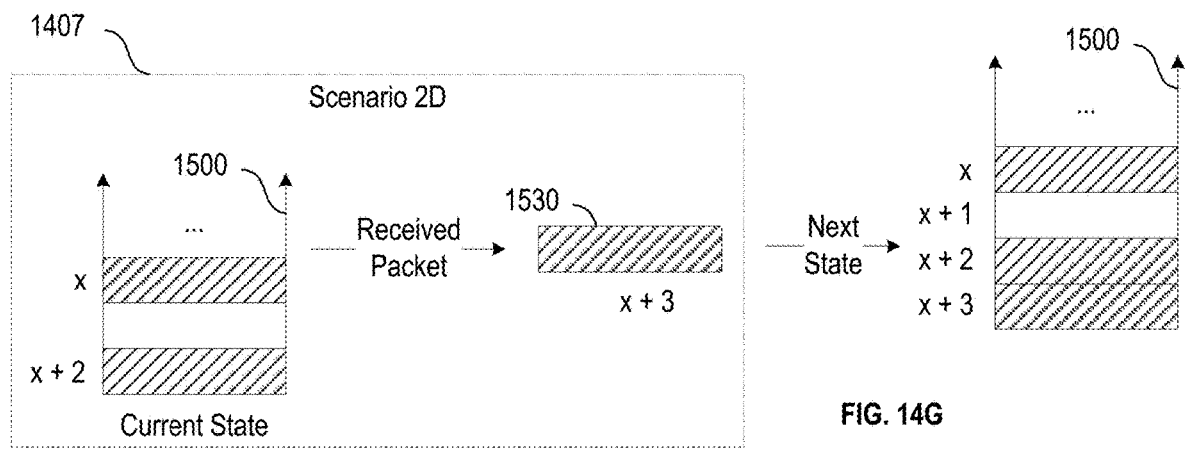
FIG. 14G illustrates a seventh scenario that may be encountered in the data structure.

FIG. 14G: In the seventh scenario 1407 (observed scenario 2D), the current state of the data structure 1500 shows the previously received packets as having TCP sequence numbers x and x+2. The most recently received packet is x+3. In FIG. 13B, when this seventh scenario is met (STEP 1347), a gap exists in the data sequence (STEP 1357), that remains when the received packet is appended to the end of the last block. The received packet is added (STEP 1367) and the sequence number is incremented.

Figure 14H:
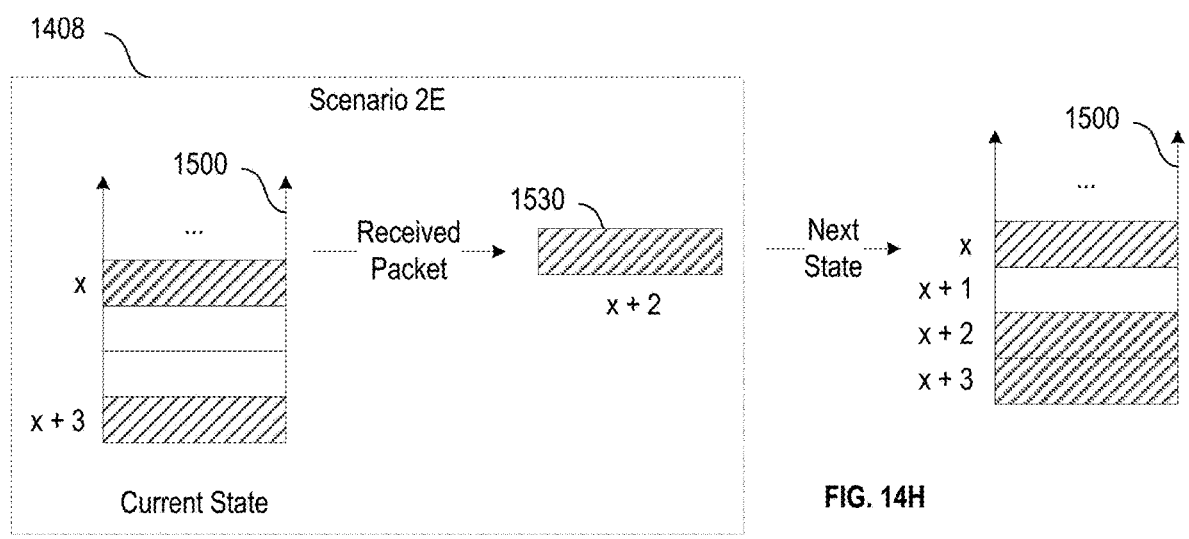
FIG. 14H illustrates an eighth scenario that may be encountered in the data structure.

FIG. 14H: In the eighth scenario 1408 (observed scenario 2E), the current state of the data structure 1500 shows the previously received packets as having TCP sequence numbers x and x+3. The most recently received packet 1530 is x+2. In FIG. 13B, when this eighth scenario is met (STEP 1348), two adjacent gaps exist before the last block (STEP 1358). The received packet is sequenced before the last block (this packet falls right before where is begins.) The received packet is added (STEP 1368), the sequence number is not incremented, and pse_snd_loss_count is incremented by 1.

If the determination is made (STEP 1348) that none of previous scenarios were satisfied, then the PSE has not seen this data yet and the received packet creates a new gap. i.e., a packet was lost between PSE and sender or the received packet arrived out of order (OOO). The received packet is saved to create a new state data_seq for this flow, and when the lost packet(s) are retransmitted, the received retransmitted packed are tracked and processed as above described for the first through eighth scenarios. Until then we just track the new sequence gap. Particularly, from STEP 1348, if none of the first through eighth scenarios were met, then operation moves to FIG. 13C (STEP 1378). FIG. 13C is a flow chart of continued operations, from FIG. 13B (STEP 1380). As noted (STEP 1382) to get to this point in operation, none of the above scenarios apply, and in this case (STEP 1384) the PSE has not seen this data yet, and the packet will create a new gap in the sequence. It is likely that a packet was lost between the PSE and the sender, or this packet arrived OOO, as noted (STEP 1386). Next, the newly-created sequence gap is tracked, and the data sequence is incremented for the received packet.

The loss counts can be reset at beginning of each time interval. The Packet Loss Rate (PLR) for a time interval will be the loss count divided by the number of data packets transmitted for that interval.

(7) Packet Loss Rate Measurement using TCP Sequence Numbers

Figure 1:
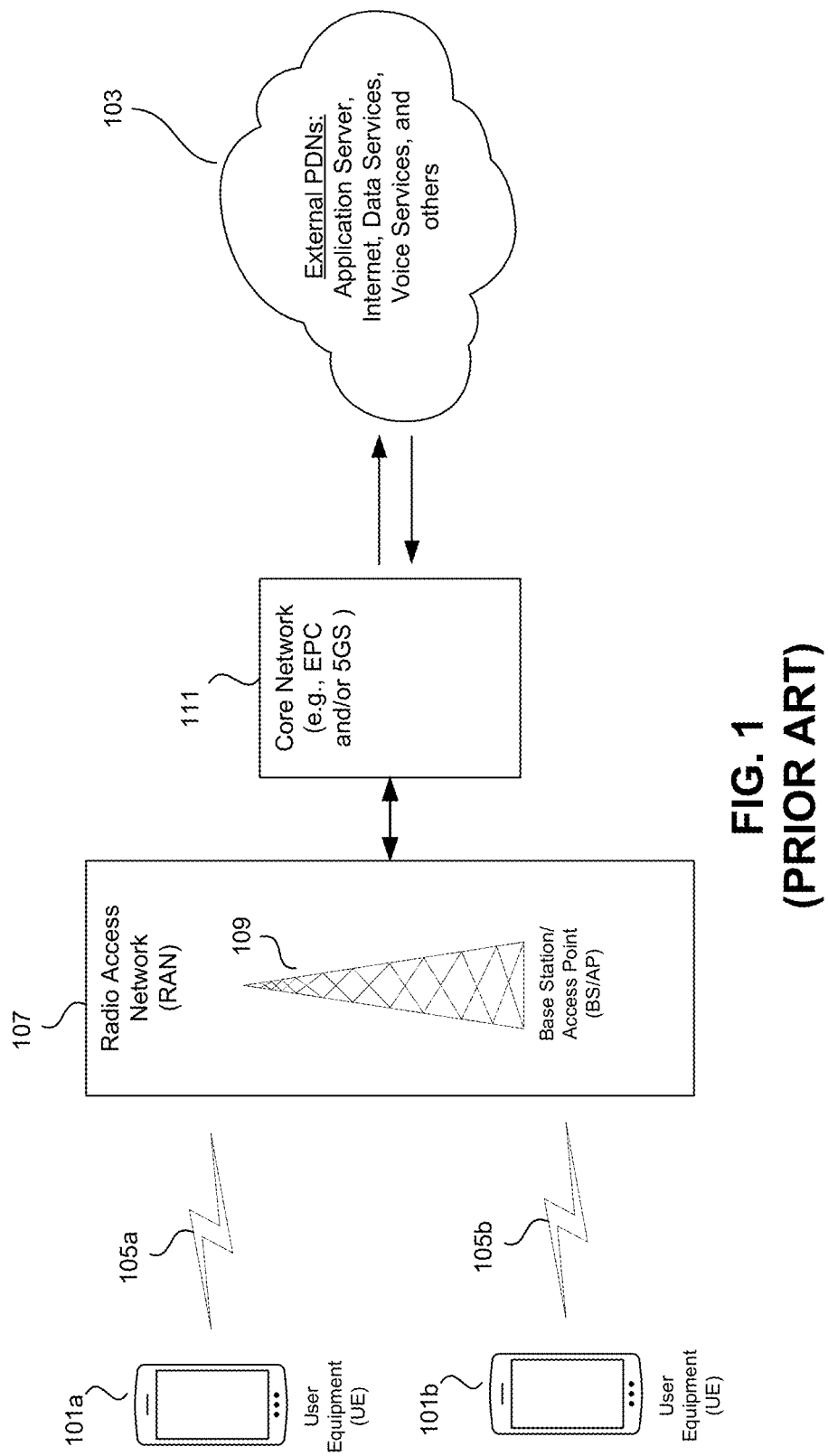
FIG. 1 is a block diagram of a basic configuration for a communication network.
Figure 2:
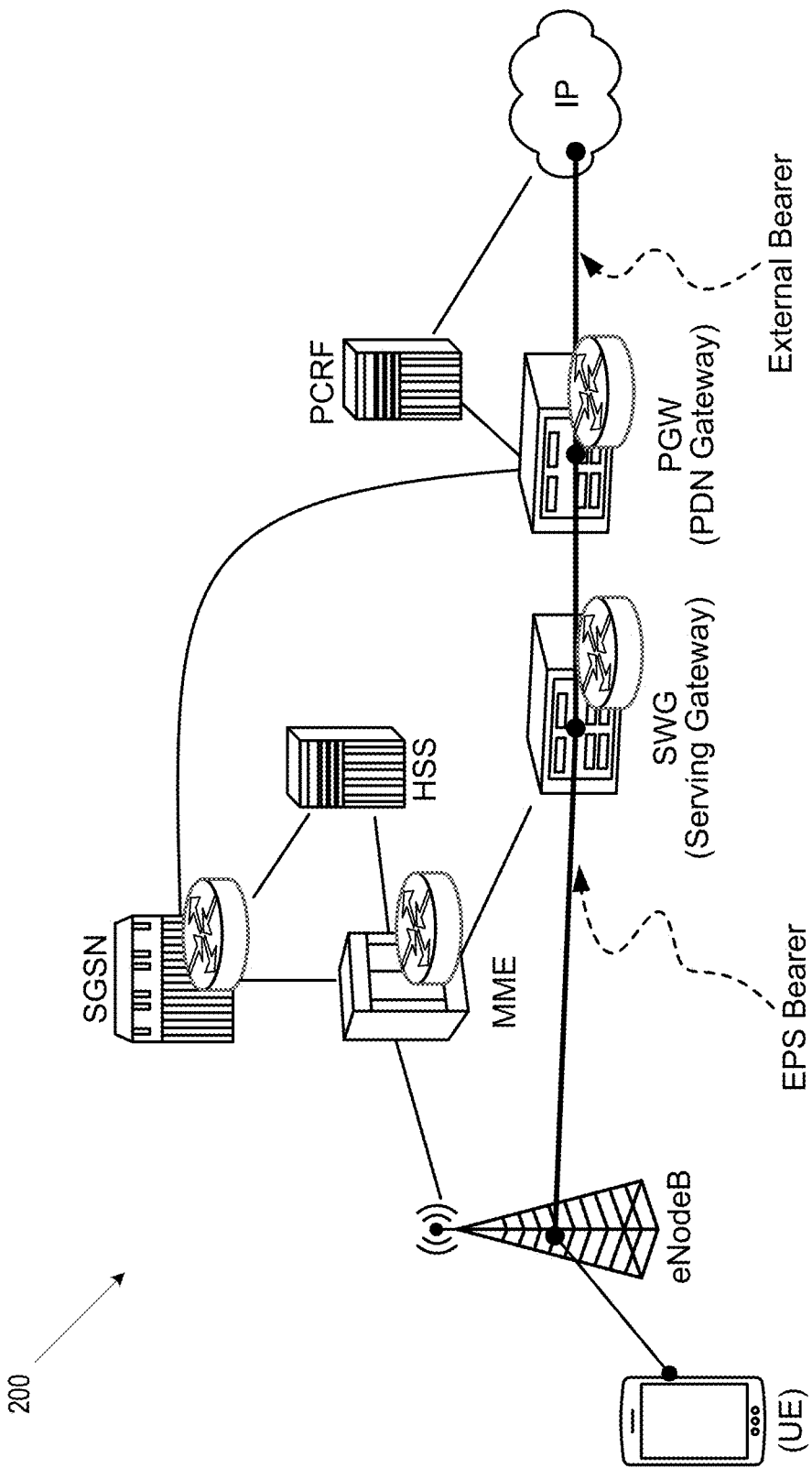
FIG. 2 is a block diagram showing one architecture of an LTE (4G) wireless communication system.

FIGS. 16-21D collectively illustrate an alternative Packet Loss Rate (PLR) measurement technique useful to measure packet loss on the downlink from a Network Source 16*10 (such as the external PDNs, the internet, and an application server shown at 103 in FIG. 1). Particularly, for the downlink, FIGS. 16, 17, 18, 19A and 19B show a downlink PLR measurement (D-PLR) technique that provide packet loss and byte loss rates for downlink packets, and for the uplink FIGS. 20, 21A, 21B, 21C and 21D show an uplink PLR (U-PLR) measurement technique that provide packet loss and byte loss rates for uplink packets.

(8) Measuring Downlink Loss

Figure 16:
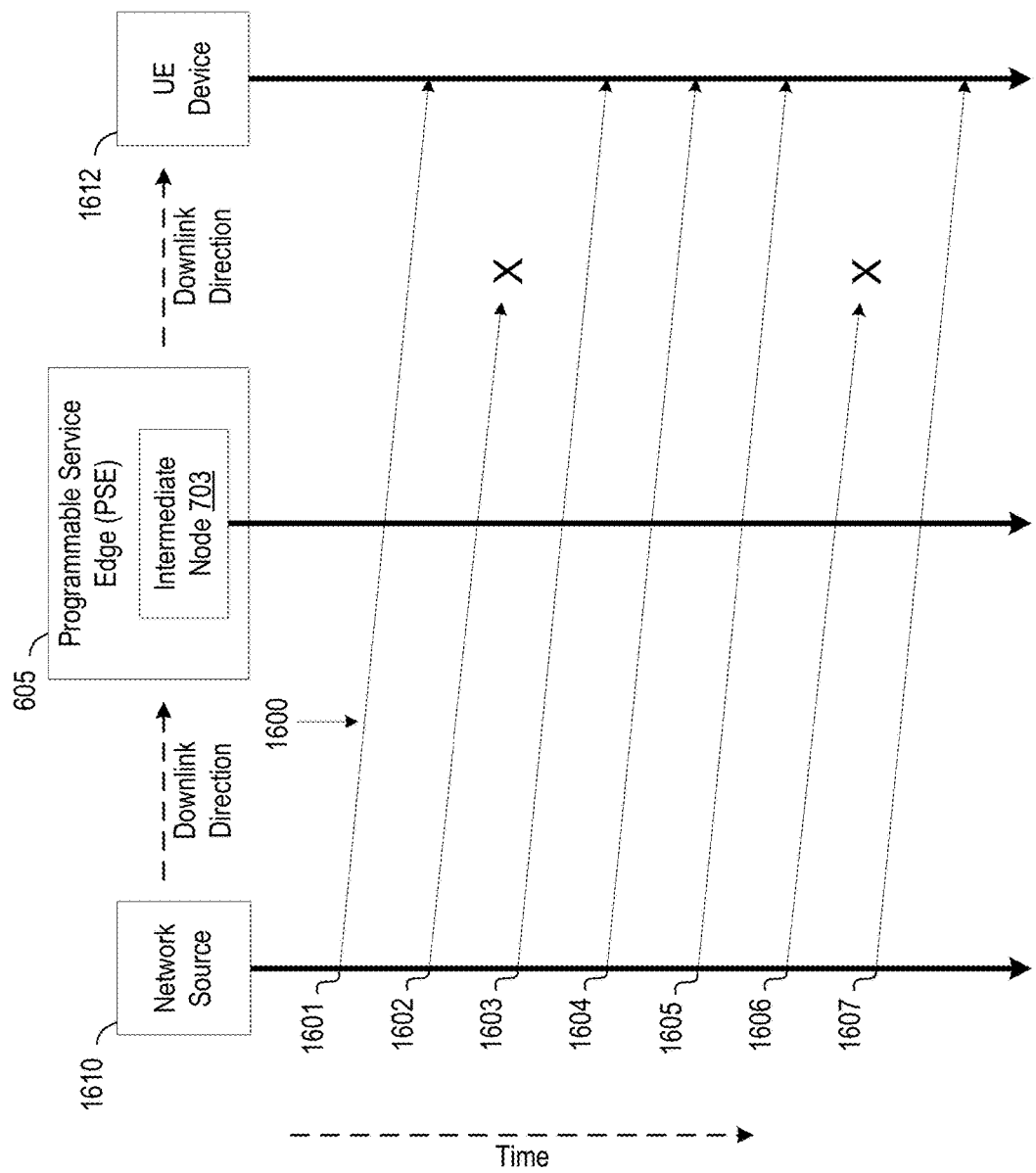
FIG. 16 is a packet flow diagram illustrating a first series of packets flowing in the downlink direction from the Network Source through the intermediate node in the Programmable Service Edge (PSE) to a UE.

FIG. 16 is a packet flow diagram showing a first series of packets 1600 of a session flowing in the downlink direction from the Network Source (NS) 16*10 through the intermediate node 703 (FIG. 7) in the Programmable Service Edge (PSE) 605, and to a UE 16*12 (such as one of the UEs 101 shown in FIG. 1). As shown in the example of FIG. 16*, four packets 1601, 1602, 1603, 1604 in the first packet series 1600 are transmitted in sequence from the NS 1610 and the first, third, and fourth packets 1601, 1603, 1604 are received at the UE 1612. However, the second packet 1602 is received and re-transmitted from the PSE 605, but does not actually arrive at the UE 1612. More generally, due to a variety of causes, some of the packets transmitted from the NS 1610 may not be received at the UE 1612. A technique is described for determining packet loss rates and byte loss rates for a series of packets transmitted from the NS 1610.

According to TCP/IP protocol, each of the packets 1601, 1602, 1603, 1604 is sent with a TCP sequence number (tcp_seqno) that identifies its place in the sequence of packets. Particularly, in TCP/IP, each header has a 32-bit sequence number tcp_seqno that equals the byte sequence number of the first byte in the current packet. The sequence number is used to keep track of how much data has been sent in the previous packets and provides the relative position of the data in the current packet with respect to the other packets. Procedurally, this sequence number is included in each transmitted packet from the NS 1610 (the host in this example) and acknowledged by the UE 1612 as an acknowledgement number to inform the sending host that the transmitted data was received successfully. When a host initiates a TCP session, its initial actual sequence number is random; it may be any value between 0 and 4,294,967,295.

This TCP sequence number (tcp_seqno) for each packet is monitored when the packet is received at the PSE 605, to identify which packets have been received and which were previously lost. As will be described, to determine which packets have been lost; the Packet Loss Rate (PLR) measurement technique estimates loss counts within an interval, based on multiple TCP sequence numbers observed at the PSE 605. Based upon these loss counts a downlink PLR can be determined. In other words, for packets in the downlink direction (i.e., from the network source), the number of retransmitted packets from the network source are counted at the PSE 605. A packet is counted as a retransmission if the PSE 605 has seen a particular tcp_seqno previously in the measurement interval.

Figures 17, 18:
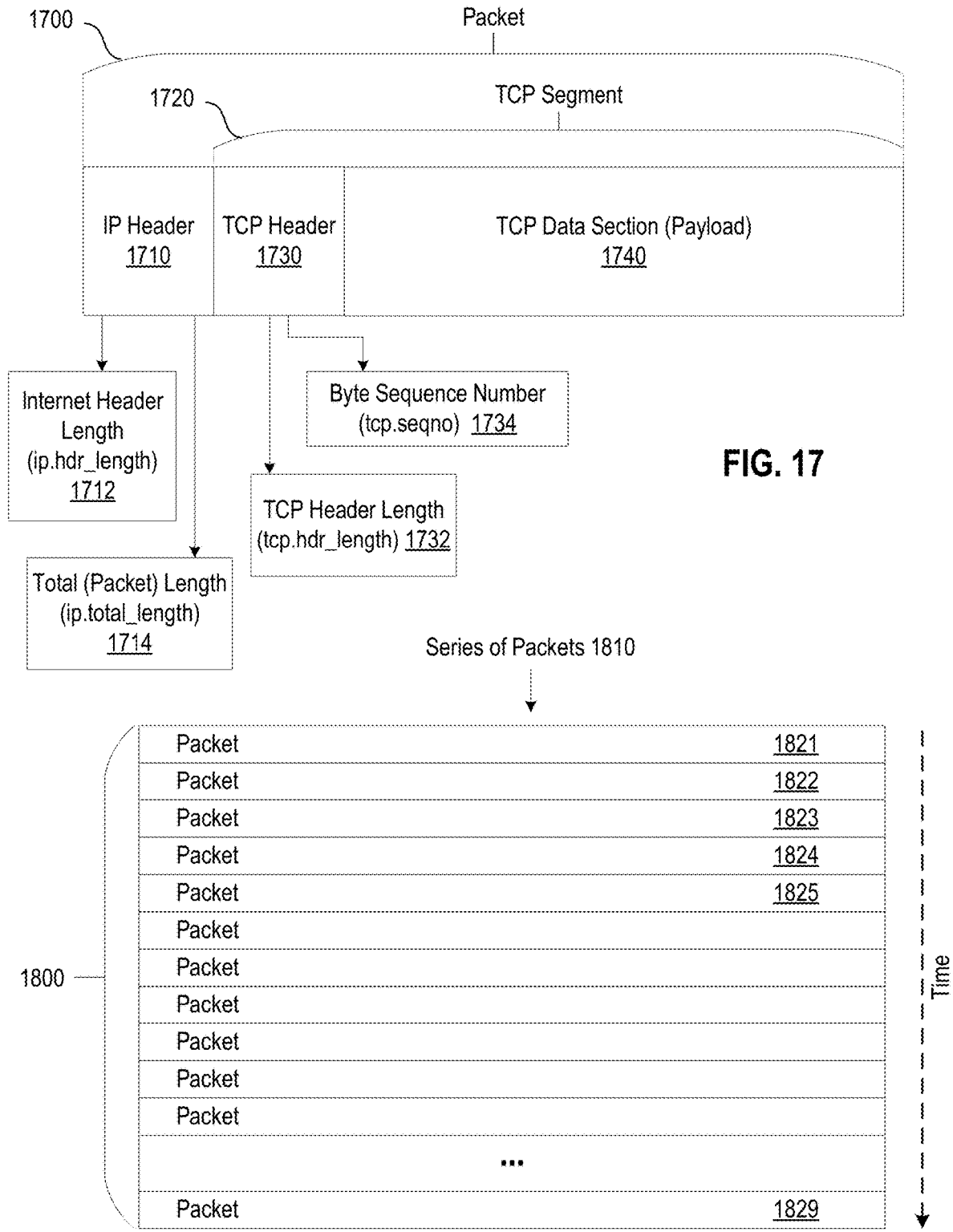
FIG. 17 is a diagram of a TCP/IP packet, illustrating relevant fields.
FIG. 18 is a diagram of a measurement interval illustrating a series of packets in the interval.

FIG. 17 is a diagram of some of the fields in a TCP/IP packet 1700. TCP/IP defines one implementation of the packets 1600 transmitted from the NS 1610. Each packet 1700 includes an IP header 1710 and a TCP segment 1720. The TCP segment 1720 includes a TCP header 1730 and a TCP data section (payload) 1740.

The IP header 1702 includes a number of fields. In IPv4 the header is variable in size due to the optional 14th field (options), and therefore the IP header 1702 includes an Internet Header Length (IHN) field 1712, which has a value referred to herein as ip.hdr_length that specifies the length of the header. More particularly, in IPv4 the IHL field contains the size of the IPv4 header in 4 bits that specify the number of 32-bit words in the header. The minimum value for this field is 5, which indicates a length of 5×32 bits=160 bits=20 bytes. As a 4-bit field, the maximum value is 15; i.e., the maximum size of the IPv4 header is 15×32 bits, or 480 bits, which equals 60 bytes.

The IP header 1702 also includes a Total Length field 1714 that specifies the packet length, a value referred to herein as ip.total_length. In IPv4 this 16-bit field, located in the IP header defines the entire packet size in bytes, including all headers and data. and the minimum size of the IP header 1702 is defined as 20 bytes (header without data) and the maximum is 65,535 bytes.

The TCP header 1730 includes a TCP Header Length field 1732 that has a value for each packet referred to herein as the tcp.hdr_length. In IPv4 the header field length is specified using the data offset (4 bits), which specifies the size of the TCP header in 32-bit words. The minimum size header is 5 4-byte words, and the maximum is 15 4-byte words, and thus giving the minimum size of 20 bytes and maximum of 60 bytes, allowing for up to 40 bytes of options in the header. The offset field is also the offset from the start of the TCP segment to the actual data.

The TCP Header 1730 also includes the TCP Sequence Number field 1734, which has a value referred to herein as tcp_seqno, which is the cumulative sequence number corresponding to the first byte of the data section 1740. In one embodiment the sequence number has a 32-bit length.

The TCP Data Section 1740 is the payload section that includes the packet's data, arranged in bytes.

FIG. 18 is a diagram of a measurement interval 1800 that includes a series 1810 of packets of a session including a first packet 1821, a last packet 1829, and a plurality of packets intermediate between first and last packets, including a second packet 1822, a third packet 1823, a fourth packet 1824, and a fifth packet 1826. Any of these packets (except the first) can be a retransmission of a previously transmitted packet. Each packet in the series 1810 includes an IP header 1710, a TCP header 1720 that includes a byte sequence number, and a TCP Data Section 1740, as described above with reference to FIG. 17. These packets that arrive at the intermediate node 703 in the PSE 605 over a period of time that defines the interval 1800. For purposes of analysis, the packets are grouped into an interval, which may be a time interval.

Figure 19A:
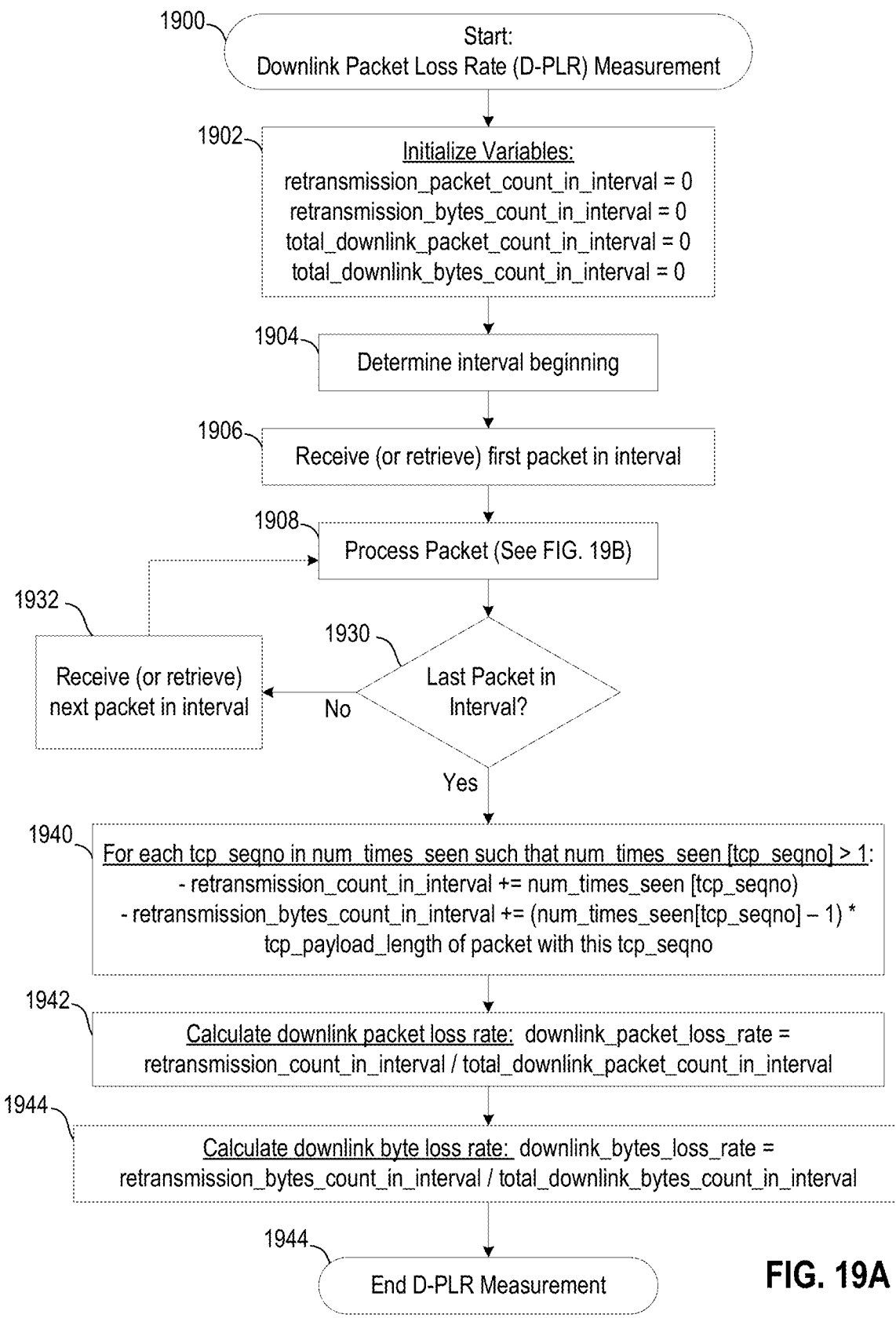
FIG. 19A and FIG. 19B are flow charts of operations to perform Downlink Packet Loss Rate (D-PLR) measurements.
Figure 19B:
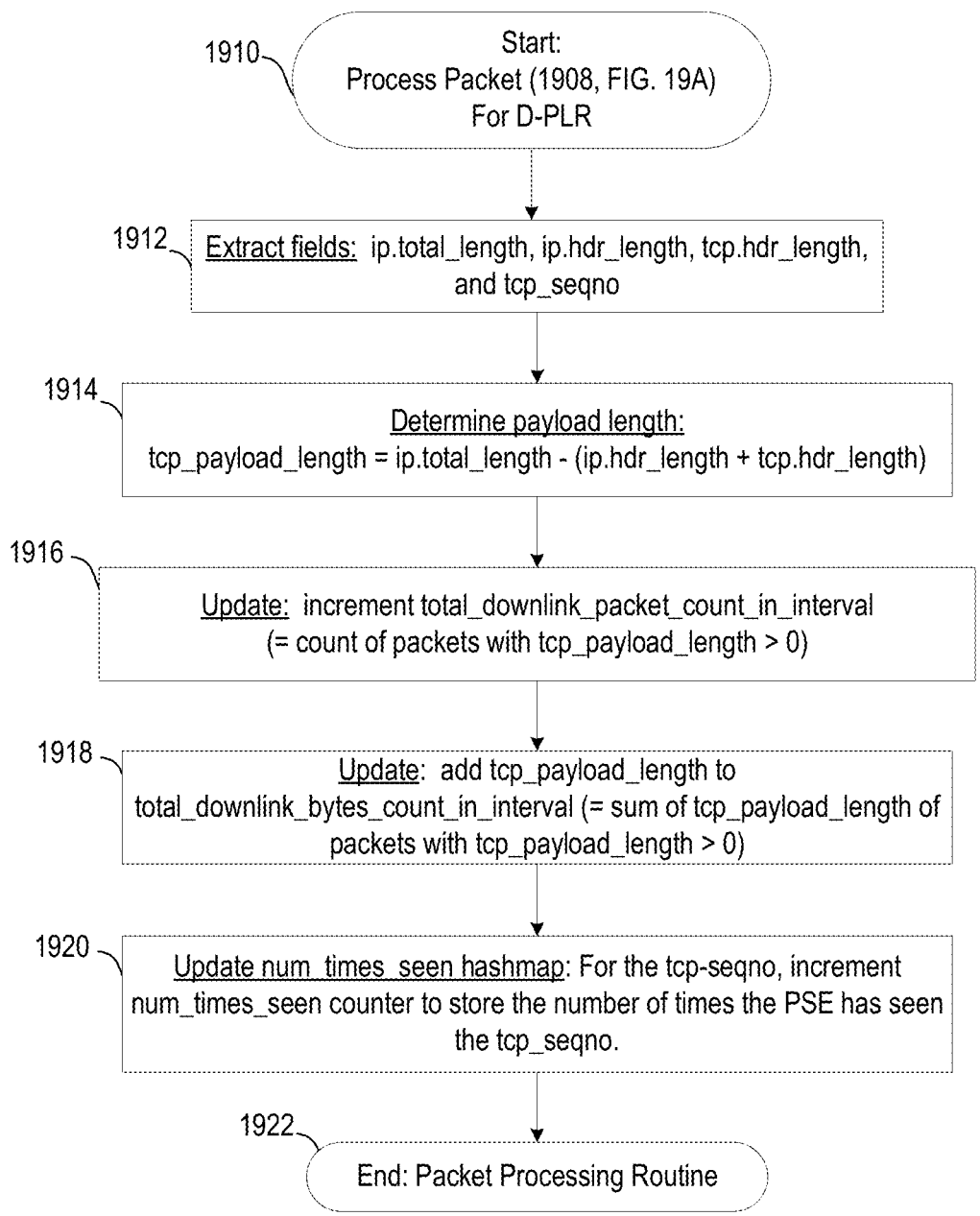

FIGS. 19A and 19B are flow charts of operations to perform Downlink Packet Loss Rate (D-PLR) measurements. The operations utilize a number of variables for processing (looping through) the series of packets over the measurement interval. These variables include: 1) a counter for the number of retransmitted packets (retransmission_packet_count_in_interval), 2) a counter for the number of retransmitted bytes (retransmission_bytes_count_in_interval), 3) a counter for the total number of packets received (total_downlink_packet_count_in_interval), and 4) a counter for the total number of bytes received (total_downlink_bytes_count_in_interval).

After starting operation (STEP 1900), the counter variables are initialized (STEP 1902) to zero: retransmission_packet_count_in_interval, retransmission_bytes_count_in_interval, total_downlink_packet_count_in_interval, and total_downlink_bytes_count_in_interval.

Next (STEP 1904) the beginning of the interval over which the measurements are to be made is determined, based upon any of a number of factors. Often, the interval will coincide with the first packet at the beginning of a session. The first packet is then received at the PSE 605 (or retrieved from memory after being received) (STEP 1906).

Then each packet in the interval is processed (STEP 1908) beginning with the first packet and ending with the last packet in the series. The steps for processing each packet in the interval are shown in FIG. 19B, beginning at STEP 1910.

FIG. 19B is a flow chart of operations to process each packet in the interval. Beginning at the start to process each packet (STEP 1910), appropriate fields are extracted (STEP 1912), including ip.total_length, ip.hdr_length, and tcp.hdr_length, and tcp_seqno.

Using the extracted field values, the length of the data field (1740, FIG. 17) is calculated (STEP 1914). Particularly the tcp_payload_length for each TCP packet is calculated as follows: tcp_payload_length=ip.total_length−(ip.hdr_length+tcp.hdr_length).

Next, counters are updated as appropriate. The total packet count is updated (STEP 1916). Particularly, the value of total_downlink_packet_count_in_interval is incremented if the tcp payload length is greater than zero, so that, after the last packet, total_downlink_packet_count_in_interval will be equal to the count of packets with tcp_payload_length>0.

Next (STEP 1918) the number of bytes in the downlink bytes is increased by the payload length. Particularly the tcp_payload_length is added to total_downlink_bytes_count_in_interval, so that after the last packet, the value of total_downlink_bytes_count_in_interval will be equal to the sum of the tcp_payload_length of the packets in the interval.

Next (STEP 1920) a hashmap (a num_times_seen_hashmap) is created to store the number of times that each byte sequence number is seen in the interval. If a sequence number is seen only once, then the number of times seen (num_times_seen [tcp_seqno]) will have the value "1" and there has been no retransmission during the interval; however, if a sequence number is seen more than once in the interval, then a retransmission is presumed, and the hashmap will store the number of times that the sequence number is seen, one for each transmission. In other words, a hashmap may be created that includes a plurality of records including a field for each tcp_seqno and a num_times_seen counter that counts the number of times the PSE 605 sees every tcp_seqno, and stores the count as: num_times_seen [tcp_seqno]. The tcp_payload_length associated with each byte sequence number may also be stored in the hashmap.

Returning to FIG. 19A, after the process 1908 is complete for the first packet, a determination is made (STEP 1930) as to whether it is the last packet in the interval, and if not, then the next packet is received (or retrieved from memory as appropriate) (STEP 1932). The process repeats iteratively for each packet in the interval until the last packet is processed, and then the resulting data can be processed to provide results. After the last packet is processed, the resulting values for total_downlink_packet_count_in_interval, and the total_downlink_bytes_count_in_interval are now available.

Using the hashmap (from STEP 1920), the number of retransmissions can be determined (STEP 1940), by whether or not a tcp_seqno is seen multiple times. Particularly, for packets, for each tcp_seqno in num_times_seen such that num_times_seen [tcp_seqno]>1, the value of the packet retransmission_count_in_interval for that tcp_seqno is set equal to the (num_times_seen [tcp_seqno]-1). The total number of packet retransmissions in the interval is given by the sum of the packet retransmission_count_in_interval, summed over all tcp_seqnos.

Also, the number of bytes retransmitted can be determined. Particularly, the value of the retransmission_bytes_count_in_interval for that tcp_seqno is set equal to the (num_times_seen[tcp_seqno]-1)*(multiplied by) the tcp_payload_length of packet with this tcp_seqno. The total number of bytes retransmitted in the interval is given by the sum of the retransmission_bytes_count_in_interval, summed over all tcp_seqnos.

The downlink loss rates for the interval can be determined from the total retransmission counts. Particularly, the packet loss rate can be determined (STEP 1942) by dividing the (total) packet retransmission_count_in_interval by the total_downlink_packet_count_in_interval, i.e., downlink_packet_loss_rate=retransmission_count_in_interval/ total_downlink_packet_count_in_interval. The byte loss rate can be determined (STEP 1944) by dividing the (total) retransmission_bytes_count_in interval by the total_downlink_bytes_count_in_interval, i.e., the downlink_bytes_loss_rate=retransmission_bytes_count_ in_interval/total_downlink_bytes_count_in_interval.

(9) Measuring Uplink Loss

FIGS. 20, 21A, 21B, 21C, 21D, and 22 collectively illustrate an uplink Packet Loss Rate (PLR) measurement technique useful to measure packet loss on the uplink from a UE device 2010 (such as one of the UEs 101) shown in FIG. 1 to a Network Source 2012 (such as the external PDNs, the internet, and an application server shown at 103 in FIG. 1). Particularly, FIGS. 20, 21A, 21B, 21C, and 21D show an uplink PLR (U-PLR) measurement method that provides packet loss and byte loss rates for uplink packets.

Figure 20:
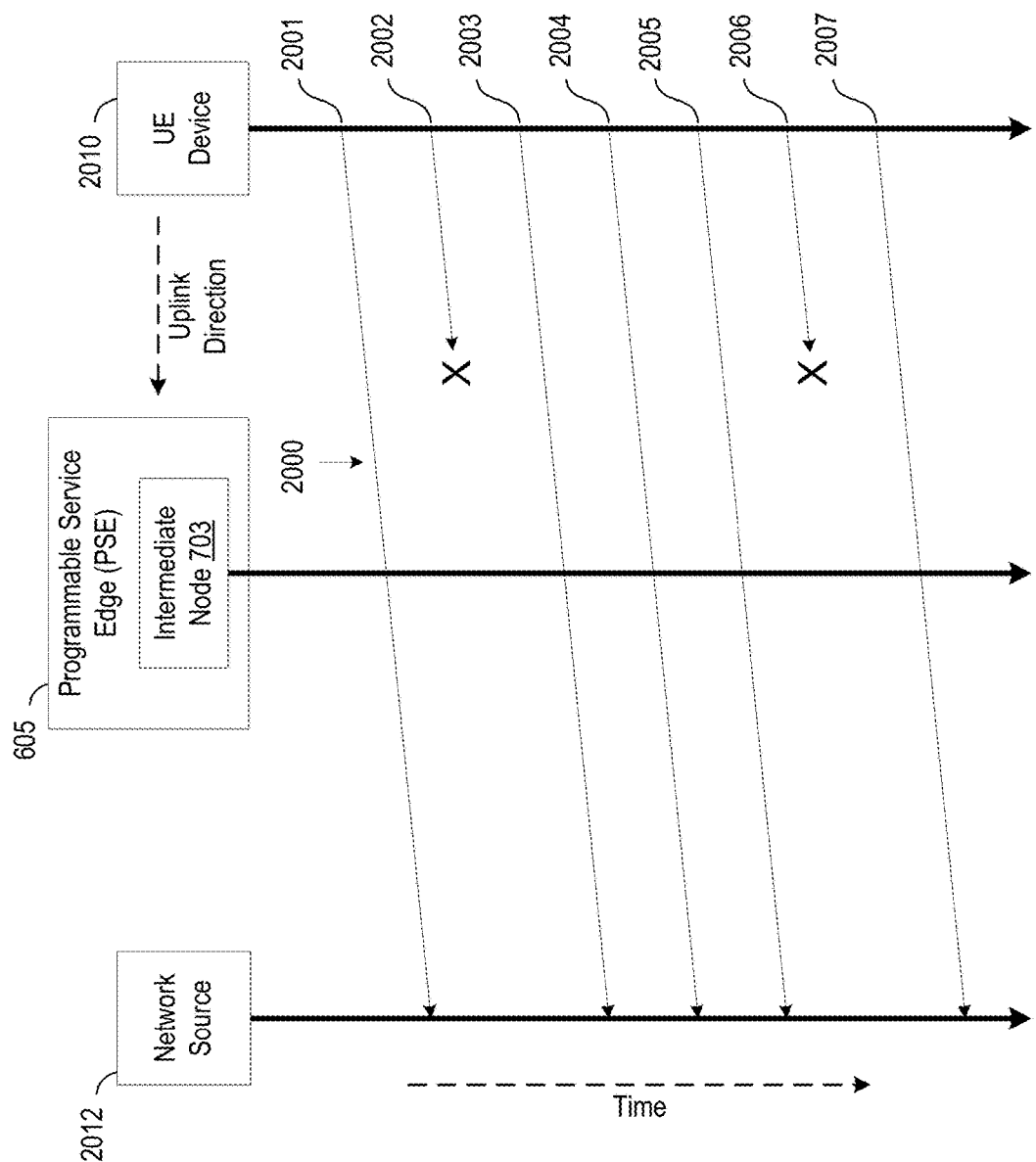
FIG. 20 is a packet flow diagram showing a series of packets flowing in the uplink direction from the UE, through the intermediate node in the Programmable Service Edge (PSE) 605, and to Network Source (NS).

FIG. 20 is a packet flow diagram showing a first series of packets 2000 of a session flowing in the uplink direction from the UE 2010 (such as one of the UEs 101 shown in FIG. 1), through the intermediate node 703 (FIG. 7) in the Programmable Service Edge (PSE) 605, and to Network Source (NS) 2012. As shown in the example of FIG. 20, four packets 2001, 2002, 1263, 2004 in the first packet series 2000 are transmitted in sequence from the UE 2010 and the first, third, and fourth packets 2001, 2003, 2004 are received at the PSE 605 and re-transmitted to the NS 2012. However, the second packet 2002 is lost and is not received by the PSE 605, and consequently does not arrive at the NS 2012. More generally, due to a variety of causes, some of the packets transmitted from the UE 2010 may not be received at the PSE 605. A technique is described for determining packet loss rates and byte loss rates for a series of packets transmitted from the UE 2010. This technique utilizes some of the same fields and variables as the downlink PLR technique previously described, including tcp_seqno, tcp_payload_length, and the interval length during which the packets are monitored, and counts the number of packets and number of bytes received.

According to TCP/IP protocol, each of the packets 2001, 2002, 2003, 2004 is sent with a TCP sequence number (tcp_seqno) that identifies its place in the sequence of packets. Particularly, in TCP/IP, each header has a 32-bit sequence number that equals the byte sequence number of the first byte in the current packet. The sequence number is used to keep track of how much data has been sent in the previous packets, and provides the relative position of the data in the current packet with respect to the other packets. Procedurally, this sequence number is included in each transmitted packet from the UE 2010 (the host in this example) and acknowledged by the NS 2012 as an acknowledgement number to inform the sending host that the transmitted data was received successfully. When a host initiates a TCP session, its initial actual sequence number is random; it may be any value between 0 and 4,294,967,295.

The TCP sequence number (tcp_seqno) for each packet is monitored when the packet is received at the PSE 605, to help identify which packets have been received and which were lost. As will be described, to determine which packets have been lost; the uplink Packet Loss Rate (U-PLR) measurement technique estimates loss counts within an interval. Based upon these loss counts an uplink PLR can be determined. In other words, for packets in the uplink direction (i.e., from the UE), the number of missing packets from the UE device 1210 are counted at the PSE 605. A packet is counted as missing if, upon examination, there is a gap in the byte numbers.

Figure 21A:
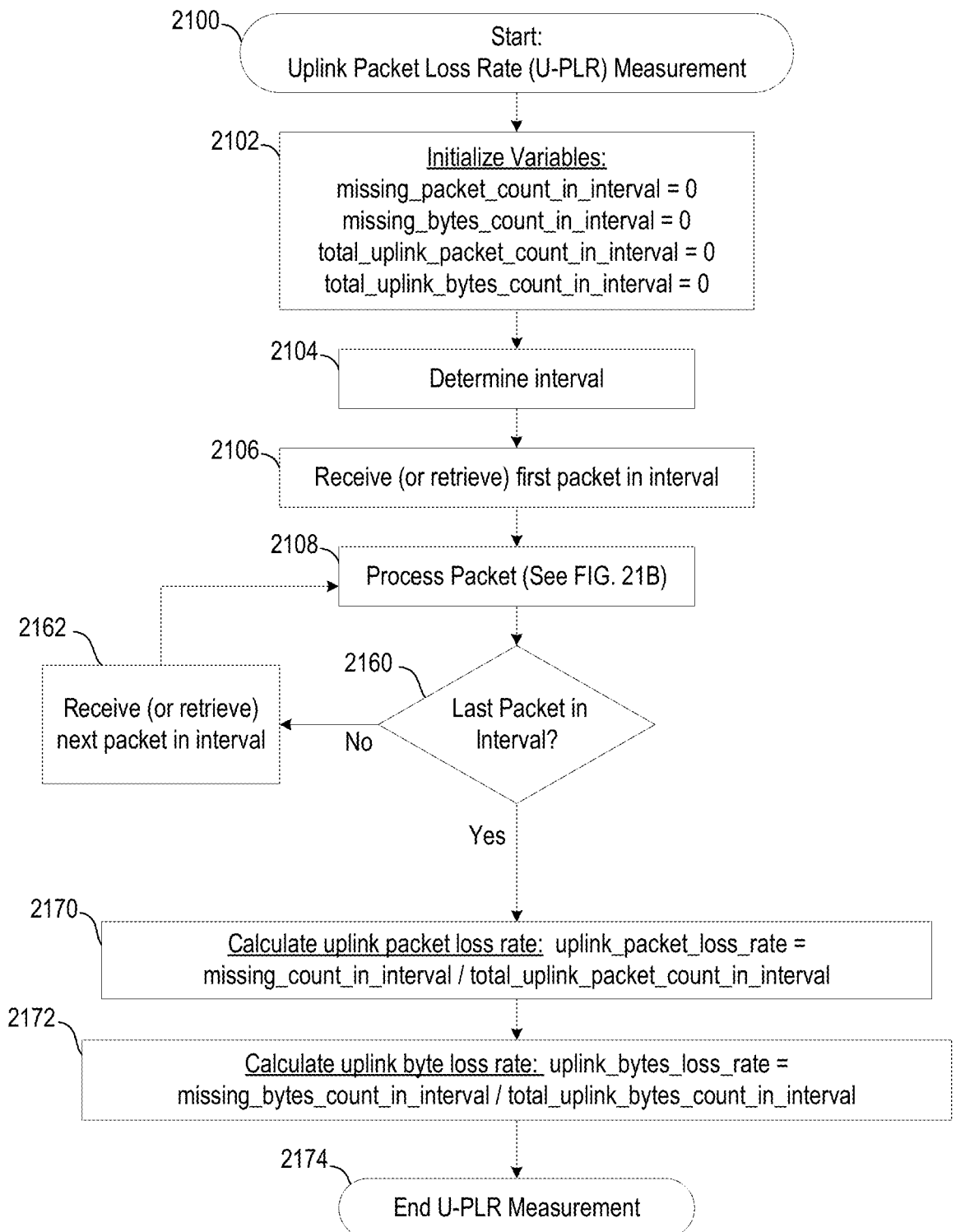
FIG. 21A, FIG. 21B, FIG. 21C, and FIG. 21D are combined flow charts of operations to perform Uplink Packet Loss Rate (U-PLR) measurements at the intermediate node in the PSE.
Figure 21B:
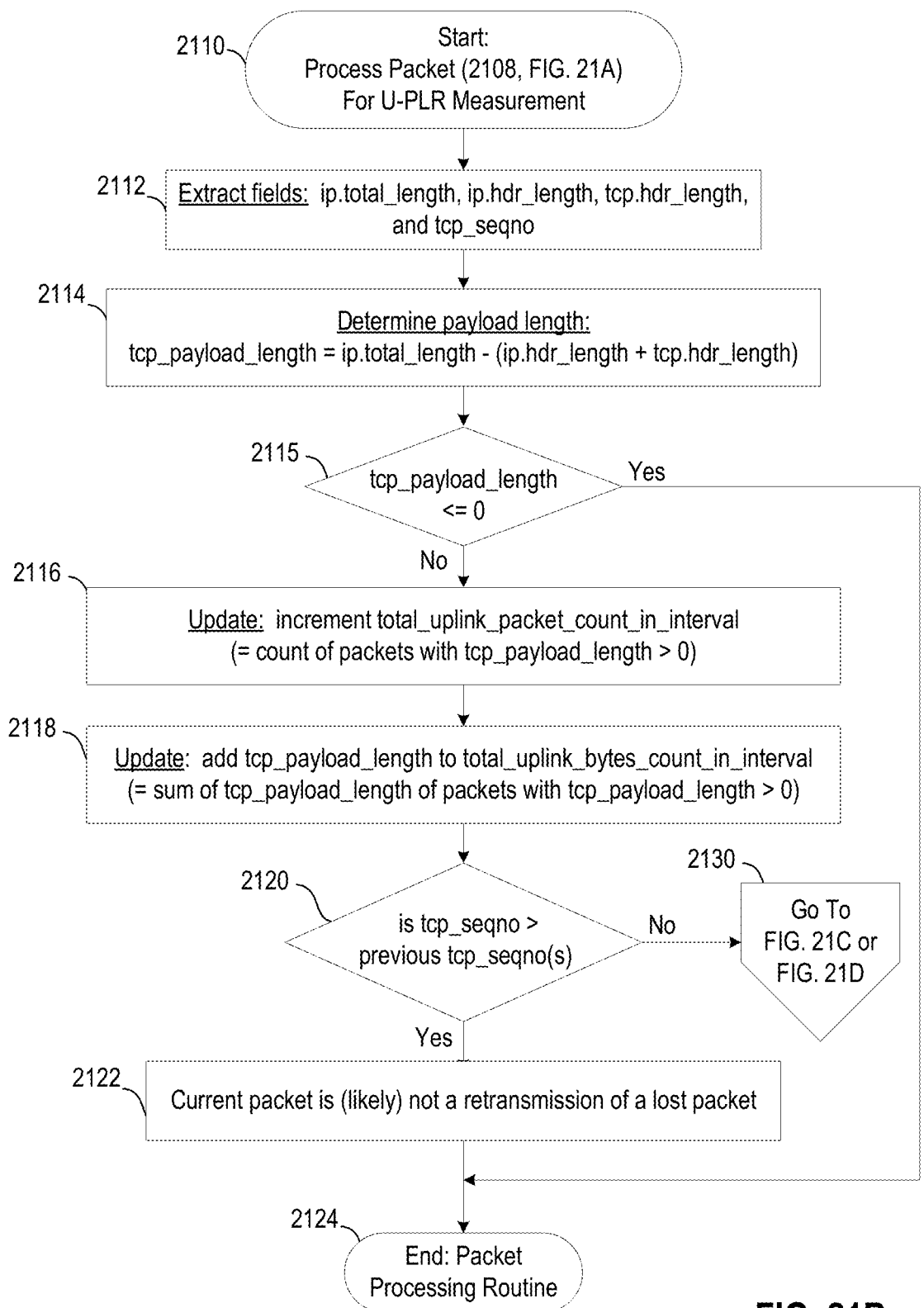
Figure 21C:
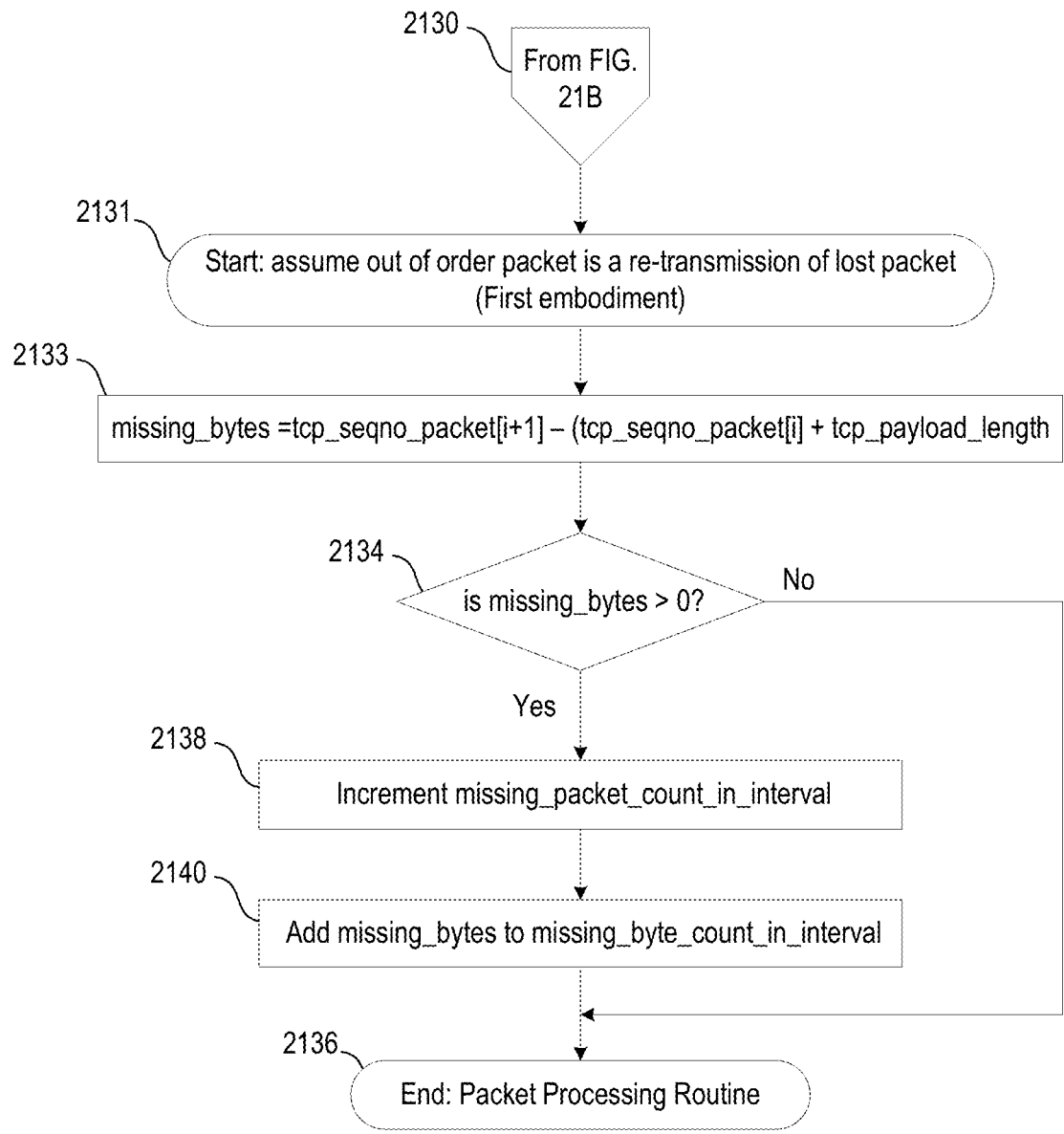

FIGS. 21A, 21B, and 21C are flow charts of operations to perform Uplink Packet Loss Rate (U-PLR) measurements at the intermediate node 703 in the PSE 605. The operations utilize a number of variables for processing (looping through) the series of packets over the measurement interval (see FIG. 18). These variables include: 1) a counter for the number of missing packets (retransmission_packet_count_in_interval), 2) a counter for the number of missing bytes (retransmission_bytes_count_in_interval), 3) a counter for the total number of packets received (total_uplink_packet_count_in_interval), and 4) a counter for the total number of bytes received (total_uplink_bytes_count_in_interval).

After starting operation (STEP 2100), the counter variables are initialized (STEP 2102) to zero: missing_packet_count_in_interval, missing_bytes_count_in_interval, total_uplink_packet_count_in_interval, and total_uplink_bytes_ count_in_interval.

Next (STEP 2104) the beginning of the interval over which the measurements are to be made is determined, based upon any of a number of factors. Often, the beginning of the interval will coincide with the beginning of a session, so the first packet received at the beginning of a session will be the same as the first packet received at the beginning of an interval; also, the end of the interval will often end at the last packet of the session. However, the interval can begin at any packet in the session (e.g., the first packet in the session or a later packet), and end at any subsequent packet in the session. The interval may include a predetermined number of packets, or the number of packets may be determined at the end of a session.

The first packet in the interval is received at the PSE 605 (or retrieved from memory after being received) (STEP 2106). Then each packet in the interval is processed (STEP 2108) beginning with the first packet and ending with the last packet in the interval. The steps for processing each packet in the interval are shown in FIG. 21B, beginning at STEP 2110. In many implementations it may be advantageous to first receive all the packets in an interval and store the data before beginning operations, and in such implementations the packets should be sorted first by time received (at the PSE 605) and then by tcp_seqno.

Figure 21D:
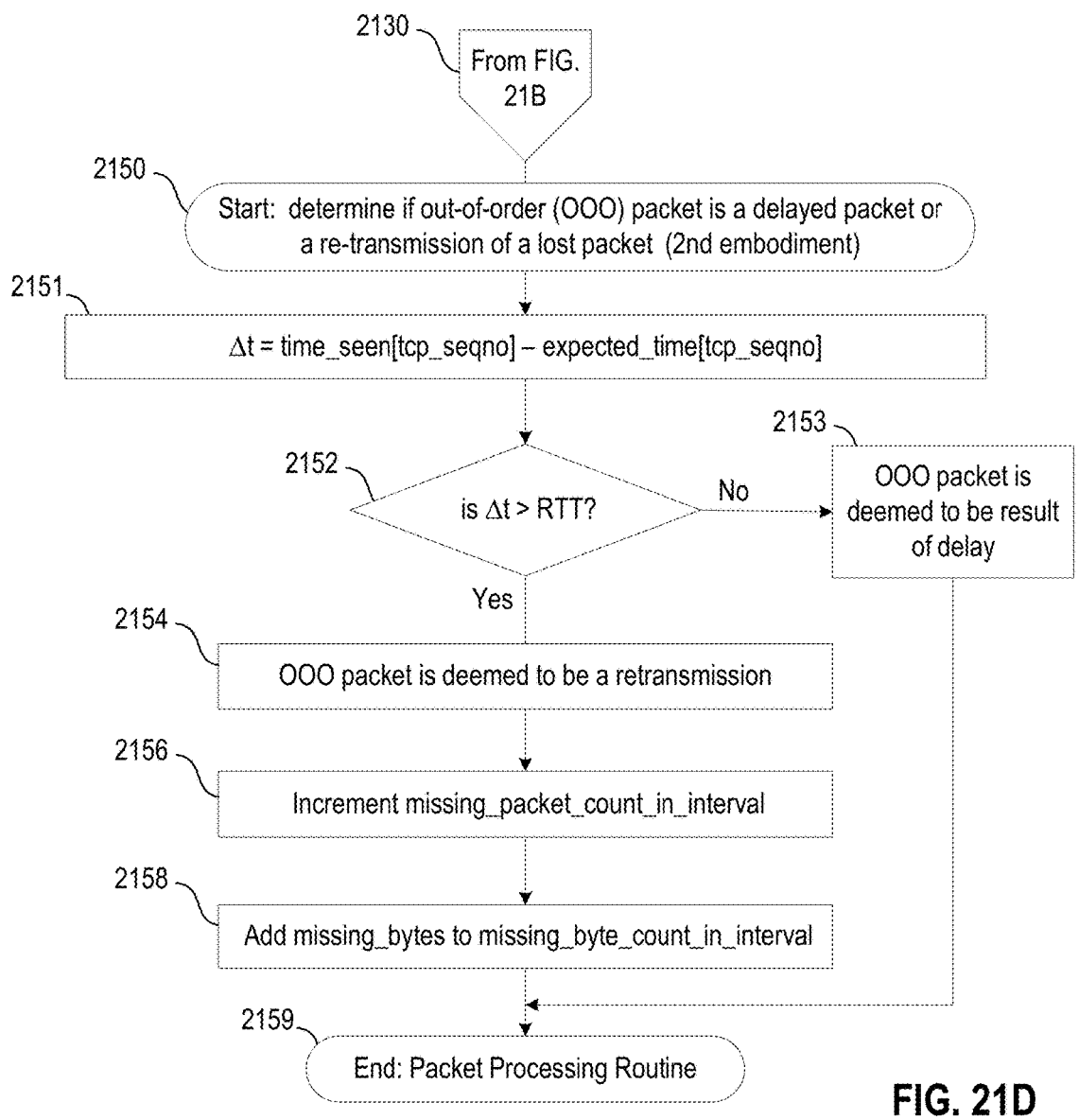

FIGS. 21B, 21C, and 21D are flow charts of operations to process each packet in the interval. Beginning at the start (STEP 2110), to process each packet appropriate fields are extracted (STEP 2112), including ip.total_length, ip.hdr_length, and tcp.hdr_length, and tcp_seqno. (For a description of these fields, see discussion with reference STEP 1912 in FIG. 19B.)

Using the extracted field values, the length of the data field (1740, FIG. 17) is calculated (STEP 2114). Particularly the tcp_payload_length for each TCP packet is calculated as follows: tcp_payload_length=ip.total_length−(ip.hdr_length+tcp.hdr_length). If the tcp_payload_length is less than or equal to zero, (STEP 2115) then the packet does not contain data and the packet processing routine ends (STEP 2124).

From STEP 2115, if the packet includes data (i.e., the tcp_payload_length is greater than zero), then counters are updated as appropriate. The total uplink packet count is updated (STEP 2116) by one with the new packet. Particularly, the value of total_uplink_packet_count_in_interval is incremented so that, after the last packet is processed, total_uplink_packet_count_in_interval will be equal to the count of packets with tcp_payload_length>0.

Next (STEP 2118) the number of bytes in the uplink bytes in increased by the payload length. Particularly the tcp_payload_length is added to total_uplink_bytes_count_in_interval, so that after the last packet is processed, the value of total_uplink_bytes_count_in_interval will be equal to the sum of the tcp_payload_length over all packets in the interval.

Next a determination is made as to whether or not the packet is out of order and might be a retransmission (STEP 2120), particularly, in one embodiment the current tcp_seqno is compared with the one or more of the previous tcp_seqnos. At STEP 2120, in one embodiment only the previous tcp_seqno is compared, in other embodiments, two or more of the previous tcp_seqnos may be compared against the two or more of the previous tcp_seqnos. From STEP 2120, if the current tcp_seqno is greater than the previous tcp_seqno(s), then the current packet is considered not a retransmission for a missing packet (STEP 2120), and then the packet processing routine ends (STEP 2124).

However, from STEP 2120, if the current tcp_seqno is less than the previous tcp_seqno(s), then that indicates that the current packet might be a retransmission of a missing packet. In that instance, operation continues (STEP 2130) to the flow chart of either FIG. 21C for a first embodiment, or FIG. 21D for a second embodiment.

FIG. 21C is a flow chart of a first embodiment of continued operations from FIG. 21B (STEP 2130), which assumes that the packet is a retransmission, and looks for missing bytes. In order to determine the number of missing bytes (if any) (STEP 2133), the tcp_seqno of the current packet [designated i+1] is subtracted from the sum of the tcp_seqno of the previous packet [designated by i] and the tcp_payload_length. This number is then tested (STEP 2134) to see if there are any missing bytes (STEP 2134), and if there are no missing data bytes, then the variable missing_bytes will be zero, and then there are no missing packets immediately prior to the current packet. In that case, from STEP 2134 the packet processing routine ends for the current packet (STEP 2136).

However, if there are missing bytes (i.e., missing_bytes>0), then from STEP 2134 the missing packet and missing byte counters are updated. Particularly, the missing_packet_count_in_interval is incremented (STEP 2138) and the missing_bytes value for the current packet is added to the missing_byte_count_in_interval (STEP 2140) to provide a running total of missing bytes in the interval. After updating the missing packet and missing byte counters, the packet processing routine is complete for this packet (STEP 2136), and operation returns to FIG. 21A where the next packet is processed.

It may be noted that there may be multiple packets missing, but the missing packet count is incremented only once. Essentially, in this first embodiment the count tracks the number of times missing events have been observed. In other embodiments, for a more detailed tracking of gaps of missing packets, more state can be stored for each interval (e.g., all the tcp_seqnos and other data in the current interval can be stored), such as may be performed using the techniques described previously with reference to FIGS. 12 through 14G.

FIG. 21D is a flow chart of a second embodiment of continued operations from FIG. 21B (STEP 2130). This second embodiment utilizes the deviation from an expected time of arrival (the "expected_time") for each packet and an RTT estimate in order to determine if an out of order packet is 1) delayed or 2) a retransmission of a lost packet. Particularly, if a packet is received out of order that should have been received earlier, then two events may have happened: 1) the out-of-order packet was delayed during its transmission through the network, e.g., the packet may have been delayed by higher priority packets in the network (packet re-ordering phenomenon) but was not lost, or 2) the packet was previously lost (e.g., dropped somewhere in network) and the current packet is a retransmission of that lost packet.

To make a determination if the out-of-order packet is a retransmission of a lost packet (and therefore the packet and bytes should be counted as missing), or just delayed, the time difference between the time a packet is observed to arrive at the intermediate node ("time_seen"), and the expected time of arrival ("expected_time") of the packet with the same tcp_seqno is determined (STEP 2151):

$$\Delta t = \text{time\_seen}[\text{tcp\_seqno}] - \text{expected\_time}[\text{tcp\_seqno}]$$

Figure 22:
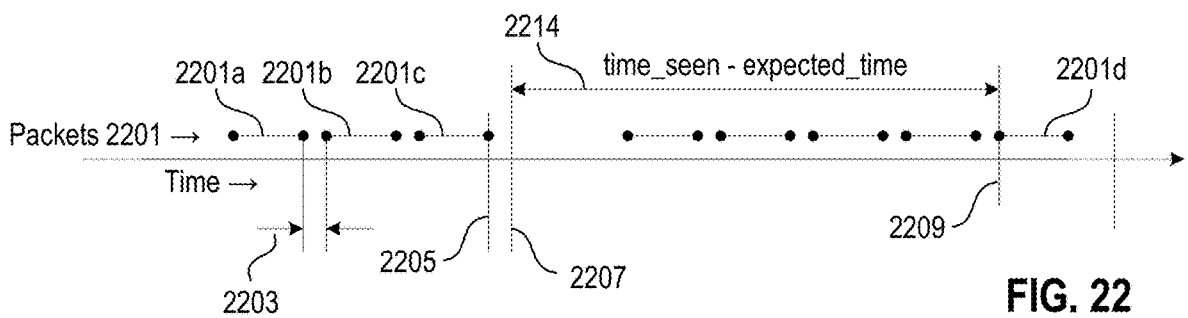
FIG. 22 is a time flow diagram of a series of packets received at an intermediate node, illustrating an expected time of receiving a packet, a missing packet, and the time_seen when the missing packet is received.

The time-seen and the expected_time are illustrated in FIG. 22 and can be determined as described herein, or other appropriate methods.

FIG. 22 is a time flow diagram of a series of packets 2201, including a first packet 2201a, followed by a second packet 2201b, and followed by a third packet 2201c, received at an intermediate node. Between the first and second packets is a small gap of time 2203 that provides an estimate of a time gap between the end of one packet and the beginning of the next packet, which for example may be around 1 or 2 milliseconds and may be related to propagation delay. In some embodiments the time gap 2203 may be averaged over a number of time gaps between packets. Also, the time for receiving each packet may vary, depending upon the length of the packet. The third packet 2201c defines an end time 2205, at which time its reception is complete. However, the fourth packet 2201d is not received when expected, and is actually not received until much later in the interval. In one embodiment, the expected time of arrival of the next packet in the sequence (i.e., the packet with the next tcp_seqno), which in this case is the expected time 2207 of arrival of the fourth packet 2201d, is the time 2205 at the end of the previous packet 2201c, plus the small propagation delay 2203. Other embodiments may use other methods for calculating an expected time of arrival of the next sequential packet.

The beginning of a packet defines the time_seen for that packet; for example in FIG. 22 a time_seen 2209 is defined by the beginning of the fourth packet 2201d. The time difference $\Delta t$ between the observed time of arrival (time_seen) of the packet and the expected_time for the fourth packet 2201d is illustrated at 2214.

For the current packet, a comparison (STEP 2152) is then made between the time difference ($\Delta t$) and an RTT estimate, which is an estimate of the round trip travel time between the UE 2010 and the Network Source 2012 (see FIG. 20). The RTT estimate may be obtained during the latency measurements specified elsewhere herein, such as with reference to FIGS. 8 and 9 or other methods.

Generally, if the time difference $\Delta t$ is less than the estimated RTT, then the packet is likely to be a delay whereas if the time difference $\Delta t$ is greater than the estimated RTT, then the packet is likely to be a retransmission. In this embodiment a comparison of whether or not $\Delta t$ is greater than the estimated RTT ($\Delta t > RTT$) is made (STEP 2152). If the time difference $\Delta t$ is less than the estimated RTT, then the packet is presumed to be the result of a delay (STEP 2153), and then the packet processing routine is complete (STEP 2159, and operation returns to FIG. 21A to process the next packet. However, if the comparison (STEP 2152) indicates that the time difference $\Delta t$ is greater than the estimated RTT, then the packet is presumed to be the result of a retransmission (STEP 2154), and then the packet processing routine continues to update the number of missing packets and missing bytes. Other embodiments may utilize different comparisons using $\Delta t$ and RTT to determine whether a packet is a retransmission or the result of a delay.

If a packet has been re-transmitted, then from STEP 2154 the missing packet and missing byte counters are updated. Particularly, the missing_packet_count in_interval is incremented (STEP 2156) and the tcp_payload_length of the current packet is added to the missing_byte_count_in_interval (STEP 2158) to provide a running total of missing bytes in the interval. After updating the missing packet and missing byte counters, the packet processing routine is complete for this packet (STEP 2159), and operation returns to FIG. 21A where the next packet is processed.

After the missing packet and byte counters are updated, then this second embodiment of the Packet Processing Routine ends (STEP 2159) and operation returns to FIG. 21A to process the next packet.

Returning to FIG. 21A, after the packet processing routine (STEP 2108) for a packet is complete. A determination is then made (STEP 2160) as to whether it is the last packet in the interval, and if not, then the next packet is received (or retrieved from memory as appropriate) (STEP 2162). The process repeats iteratively for each packet in the interval until the last packet is processed, and then the resulting data can be processed to provide results. After the last packet in the interval is processed, the resulting values for total_uplink_packet_count_in_interval, and the total_uplink_bytes_count_in_interval are now available. Also, the final totals including packet missing_count_in_interval, and missing_bytes_count_in_interval are available.

The uplink loss rates for the interval can be determined from the total missing counts. Particularly, the uplink packet loss rate can be determined (STEP 2170) by dividing the missing_count_in_interval by the total_uplink_packet_count_in_interval, i.e., uplink_packet_loss_rate=missing_count_in_interval/total_uplink_packet_count_in_interval. The byte loss rate can be determined (STEP 2172) by dividing the (total) missing_bytes_count_in_interval by the total_uplink_bytes_count_in_interval, i.e., the uplink_bytes_loss_rate0=missing_bytes_count_in_interval/total_uplink_bytes_count_in_interval.

Following determination of the uplink loss rates, the U-PLR measurement is complete, and operation ends (STEP 2174).

(10) Network Performance and Service Guarantees/Promises

The system described herein provides a way to monitor and analyze communications determine the extent to which the guarantees/promises of performance are being met by the network, and take appropriate corrective action.

Particularly, network slice technology guarantees/promises a certain performance for an end-to-end data path. These network slice guarantees/promises may be part of a contractual arrangement (e.g., SLAs), an informal arrangement, or simply based upon expectations of the users and/or others. In FIG. 23, the service guarantees are shown as DATA 2306. These guarantees/promises of network performance may be described in some embodiments by a range of Key Performance Indicators (KPIs), which are metrics that quantify specific aspects of a functioning network, and/or a Quality of Service (QoS), or any other appropriate measure. The particular service guarantees and KPIs vary depending upon the network installation; each network operator utilizes KPIs specific to their environment to ensure reliability and maintain proper controls on their network. In one embodiment, KPIs can include predetermined values of one or more of the packet latency, PDV, and PLR as described herein, or they may be used in some way to provide another KPI or define a QoS.

Figure 23:
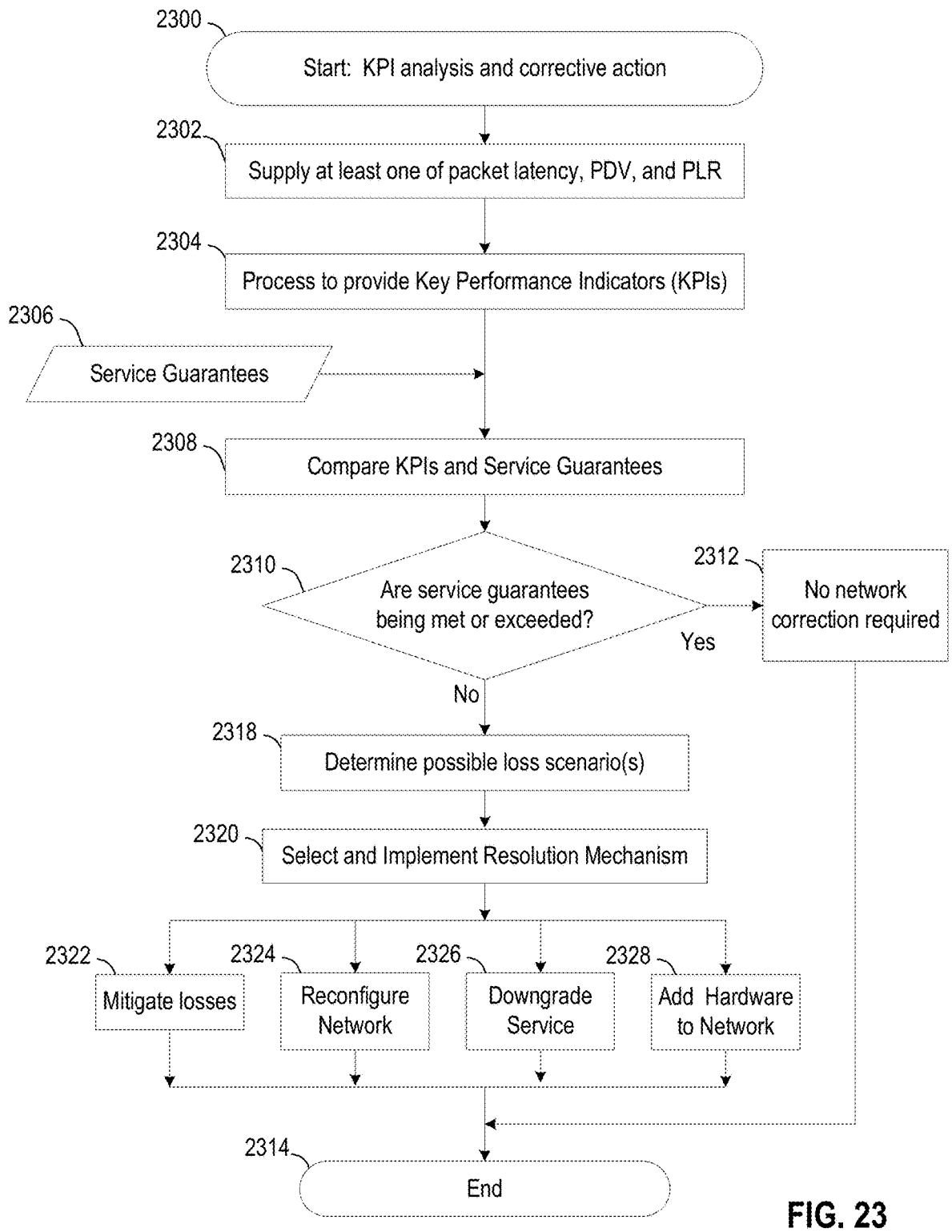
FIG. 23 is a flow chart of operations to utilize at least one of the measured values of packet latency, Packet Delay Variation (PDV) and the Packet Loss Rate (PLR) to determine the extent to which service guarantees have been met and take appropriate corrective action.

FIG. 23 is a flow chart of operations to utilize at least one of the measured values of packet latency, Packet Delay Variation (PDV) and the Packet Loss Rate (PLR) to determine the extent to which service guarantees have been met and take appropriate corrective action. Particularly at start (STEP 2300) at least one of the latency, PDV, and PLR have been received and determined on a near real-time basis as previously described. This data is then supplied (STEP 2302), and then processed (or used directly) to provide KPIs (STEP 2304).

The service guarantees (DATA 2306) are then compared with the KPIs provided from the latency, PDV, and/or the PLR (STEP 2310). If the service guarantees have been met or exceeded, then no corrective action is needed (STEP 2312). As no further action is required, operation then ends (STEP 2314). It may be noted that if the service guarantees have been exceeded, then this information indicates excess capacity, which may be useful for later corrections.

If the service guarantees have not been met (from STEP 2310) then possible loss scenarios may be determined (STEP 2318). Particularly, many different loss scenarios are possible: each scenario may have different amounts of latency, packet delay variation, and packet loss rate.

Responsive to the loss scenario (the latency, PDV, and/or the PLR, and in some implementations the KPI and other information), the core network 607 can select and implement resolution mechanisms (STEP 2320) as appropriate to improve performance and decrease the packet loss rate to a value below the service guarantee and/or a predetermined value. Particularly, many different resolution mechanisms can be implemented depending upon the network configuration, available resources, and any of a number of other factors.

For example, depending upon observed loss scenario the network (e.g., the core network 607) or other units can provide recommendations on how to troubleshoot this particular scenario. In some embodiments the network can estimate or determine potential sources for the loss, and provide appropriate responses. In some loss scenarios, mitigative actions can be taken (STEP 2322),the network can be reconfigured to reduce losses (STEP 2324), or other resolution mechanisms appropriate for the particular scenario can be implemented. For example, depending upon observed ranges of latency, PDV, and the PLR, more efficient ways to schedule applications on network slices may be suggested and implemented.

If simple loss mitigation techniques don't work, or are not feasible for some reason, the network can be provisioned to provide lower quality of service (STEP 2326). In this case, the user may be informed that the network is provisioning to a lower level of service because the network cannot support the previous service level. Alternatively, hardware components can be added to the network (STEP 2328), and/or the network plan can be changed to meet the guarantees, and therefore better support the users. Generally, the solution options vary with the installation, depending upon the type of network, the particular installation hardware, the network configuration, and the needs of the users. For example, load control may be implemented, data paths (e.g., bearers) can be re-provisioned, QoS can be changed for devices or bearers, and/or admission control may be implemented.

Following implementation of resolution mechanisms and any other corrective actions, operation to analyze the KPIs and service guarantees, and take corrective action, are complete.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open-ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of measuring packet loss rates of a communication network over an interval of a packet-based communication session between a data sender (DS) that generates a series of packets and a data receiver (DR), the packet loss rates measured at an intermediate node of the communication network and indicative of a loss rate of the communication network between the intermediate node and a wireless device, the intermediate node connected between the DS and DR, comprising the steps of:
communicating said series of packets through the communication network, to the intermediate node;
receiving the series of packets at the intermediate node during the interval;
storing data from each of said packets received at the intermediate node;
estimating a Round Trip Time (RTT) for said packets; and
processing said stored data to measure packet loss rate responsive to the RTT estimate and the stored data;
wherein processing the stored data includes, for each packet:
extracting a TCP sequence number;
determining a payload length;
making an estimate of the RTT for the session; and
comparing the received TCP sequence number with all TCP sequence numbers previously received, and
if there is a match with any previously received TCP sequence number, then incrementing a packet loss counter by 1,
otherwise classifying a scenario responsive to the stored data.

2. The method of claim 1 wherein classifying the scenario includes examining the received series of packets and stored data.

3. The method of claim 2 wherein the step of examining the received series of packets and stored data includes determining where gaps exist in the stored data, and whether a packet of the received series of packets fills one of the gaps.

4. A method of measuring downlink packet loss rates over an interval of a packet-based communication session between a network source (NS) and a wireless User Equipment (UE) device, the downlink packet loss rates measured at an intermediate node of a communication network, the intermediate node connected between the NS and UE, the downlink packet loss rate indicative of a loss in the communication network between the intermediate node and the UE, each packet including a byte sequence number and having a payload length, comprising the steps of:
  receiving a series of packets from the NS at the intermediate node during the interval in the communication session, and communicating said series of packets through the intermediate node to the UE;
  providing a hashmap that includes fields for a byte sequence number and a num_times_seen counter for storing a number of times that a byte sequence number has been seen;
  for each packet received at the intermediate node, and repeating (a)-(e) until a last packet in the interval:
    (a) determining the byte sequence number;
    (b) incrementing a total downlink packet counter;
    (c) determining the payload length;
    (d) adding the payload length to a downlink bytes counter; and
    (e) incrementing the num_times_seen counter for the byte sequence number in the hashmap;
  determining a retransmission count for each byte sequence number responsive to the num_times_seen counter for each byte sequence number;
  providing a retransmission count for the interval by totaling the retransmission count over all packets in the interval; and
  determining a downlink packet loss rate by dividing the retransmission count for the interval by the total downlink packet counter.

5. The method of measuring downlink packet loss rates of claim 4, further including determining a downlink byte loss rate, comprising:
  determining a number of bytes retransmitted for each byte sequence number responsive to the retransmission count and payload length for each byte sequence number;
  providing a total number of bytes retransmitted for the interval by totaling a number of bytes retransmitted over all packets in the interval; and
  determining a downlink byte loss rate by dividing the retransmission bytes count for the interval by the total number of bytes retransmitted.

6. The method of claim 4, wherein the communication network has service guarantees for the communication session, and further comprising the step, responsive to the downlink packet loss rate, of determining if the service guarantees have been met, and if not, then implementing a resolution mechanism responsive to said determination to reduce the downlink packet rate loss.

7. The method of claim 6 wherein the step of implementing a resolution mechanism includes at least one of mitigating losses, reconfiguring the communication network, downgrading service, and adding hardware to the communication network.

8. A method of measuring uplink packet loss rates over an interval of a packet-based communication session between a wireless User Equipment (UE) and a Network Source (NS), the packet loss rates measured at an intermediate node of a communication network, the intermediate node connected between the UE and the NS, the uplink packet loss rate indicative of a loss in the communication network between the intermediate node and the UE, each packet including a byte sequence number and having a payload length, comprising the steps of:
  receiving a series of packets from the UE at the intermediate node during the interval in the communication session, and communicating said packets through the intermediate node to the NS;
  for each packet received at the intermediate node, and repeating (a)-(h) until a last packet in the interval:
    (a) determining and storing the byte sequence number;
    (b) incrementing a total uplink packet counter;
    (c) determining the payload length; and
    (d) adding the payload length to a total uplink bytes counter;
    (e) if the byte sequence number of a current packet is greater than a byte number of a previously-received packet, then determining that the packet with the greater byte sequence number is not a retransmission and ending processing for that packet,
    (f) if the byte sequence number of a current packet is less than or equal to a byte number of a previously-received packet, then determining whether a current packet is a delayed packet or a retransmission,
    (g) if a packet is determined to be the result of delay then ending processing for the packet;
    (h) if a packet is determined to be a retransmission, then incrementing a missing packet counter and adding the payload length to a missing byte counter and ending processing for that packet;
  determining an uplink packet loss rate by dividing the missing packet counter for the interval by the total uplink packet counter; and
  determining an uplink byte loss rate by dividing the missing byte counter for the interval by the total uplink bytes counter.

9. The method of claim 8, wherein the step of determining if the current packet is a delayed packet or a retransmission comprises:
  observing a time of arrival of an arrived packet;
  determining an expected time of arrival of the arrived packet;
  estimating a Round Trip Time (RTT) for interval packets in the interval; and
  responsive to the estimated RTT and a difference between the observed time arrival and the expected time of arrival, determining if at least one of the interval packets is the result of delay or a retransmission.

10. The method of claim 8, wherein the communication network has service guarantees for the communication session, and further comprising the step, responsive to the uplink packet loss rate and uplink byte loss rate, of determining if the service guarantees have been met, and if not, then implementing a resolution mechanism responsive to said determination to reduce the uplink packet rate loss.

11. The method of claim 10, wherein the step of implementing a resolution mechanism includes at least one of mitigating losses, reconfiguring the communication network, downgrading service, and adding hardware to the communication network.

\* \* \* \* \*